United States Patent
Imae et al.

(10) Patent No.: US 9,082,528 B2
(45) Date of Patent: Jul. 14, 2015

(54) METHOD FOR MAKING CARBON NANOTUBE-LOADED ELECTRODE, CARBON NANOTUBE-LOADED ELECTRODE MADE BY THE METHOD, AND APPLICATIONS THEREOF

(75) Inventors: Toyoko Imae, Taipei (TW); Ampornphan Siriviriyanun, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 736 days.

(21) Appl. No.: 13/336,326

(22) Filed: Dec. 23, 2011

(65) Prior Publication Data

US 2013/0161066 A1 Jun. 27, 2013

(51) Int. Cl.
| | |
|---|---|
| *H01M 4/00* | (2006.01) |
| *H01B 1/24* | (2006.01) |
| *H01M 4/86* | (2006.01) |
| *H01M 4/60* | (2006.01) |
| *H01M 4/04* | (2006.01) |
| *B82Y 40/00* | (2011.01) |
| *B82Y 30/00* | (2011.01) |
| *C01B 31/02* | (2006.01) |

(52) U.S. Cl.
CPC . *H01B 1/24* (2013.01); *B82Y 30/00* (2013.01); *B82Y 40/00* (2013.01); *C01B 31/0273* (2013.01); *H01M 4/049* (2013.01); *H01M 4/60* (2013.01); *H01M 4/8647* (2013.01); *H01M 4/00* (2013.01)

(58) Field of Classification Search
CPC ......... H01M 4/00; H01M 4/049; H01M 4/60; H01M 4/8647
USPC ........................................... 429/523, 209, 238
See application file for complete search history.

(56) References Cited

U.S. PATENT DOCUMENTS

2009/0246408 A1* 10/2009 Chan et al. ..................... 427/577

OTHER PUBLICATIONS

Georgakilas et al. Decorating carbon nanotubes with metal or semiconductor nanoparticles. J. Mater. Chem., vol. 17, 2007, pp. 2679-2694 [online], [retrieved Nov. 19, 2014]. Retrieved from the Internet <URL: http://pubs.rsc.org/en/content/articlelanding/2007/jm/b700857k#!divAbstract>.*

(Continued)

*Primary Examiner* — Jonathan G Leong
*Assistant Examiner* — James Erwin
(74) *Attorney, Agent, or Firm* — WPAT, P.C.; Anthony King

(57) ABSTRACT

The present invention provides a method for fabricating a carbon nanotube-loaded electrode enabling that hybrid carbon nanotubes comprising dendrimer-encapsulated metal nanoparticles covalently immobilized on carbon nanotubes via a first covalent bond are made and such hybrid carbon nanotubes are then covalently immobilized on a metal electrode coated with a self-assembled monolayer via a second covalent bond. Also provided is a carbon nanotube-loaded electrode made by the method. The electrode thus made possesses high durability, reactivity and stability.

13 Claims, 22 Drawing Sheets

(56) References Cited

OTHER PUBLICATIONS

Pittlekow et al. Poly(amidoamine)-Dendrimer-Stabilized Pd(0) Nanoparticles as a Catalyst for the Suzuki Reaction. Langmuir, vol. 19, 2003, pp. 7682-7684 [online], [retrieved Nov. 20, 2014]. Retrieved from the Internet <URL: http://pubs.acs.org/doi/pdf/10.1021/la0348822>.*

Herrero et al., Gold Dendrimer Encapsulated Nanoparticles as Labeling Agents for Multiwalled Carbon Nanotubes, ACS Nano 2010, 4(2), 905-912.

Lu et al., Dendrimer-Mediated Synthesis of Water-Dispersible Carbon-Nanotube-Supported Oxide Nanoparticles, J. Phys. Chem. C 2007, 111, pp. 8459-8462.

Lu et al., Size-Controlled in situ Synthesis of Metal Nanoparticles on Dendrimer-Modified Carbon Nanotubes, J. Phys. Chem. C, 2007, 111, pp. 2416-2420.

Wu et al., Carbon nanotube supported Pt electrodes for methanol oxidation: A comparison between multi- and single-walled carbon nanotubes, J. Power Sources 2007, 174, 148-158.

Yang et al., Platinum nanoparticles-doped sol-gel/carbon nanotubes composite electrochemical sensors and biosensors, Biosensors and Bioelectronics 2006, 21, 1125-1131.

* cited by examiner (a)

(b)

(c)
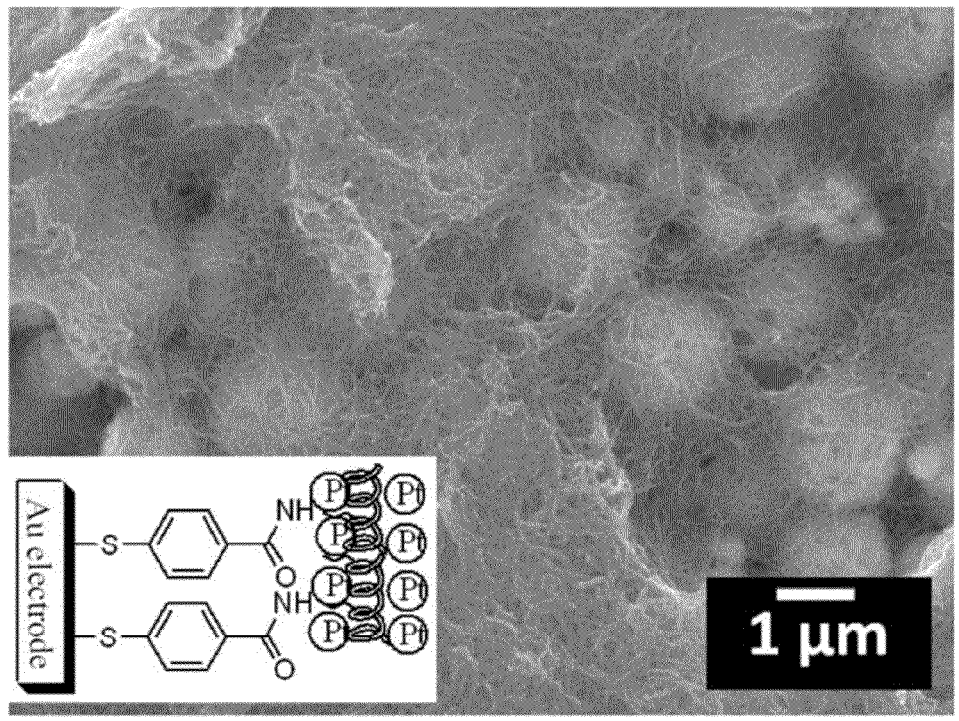
(d)
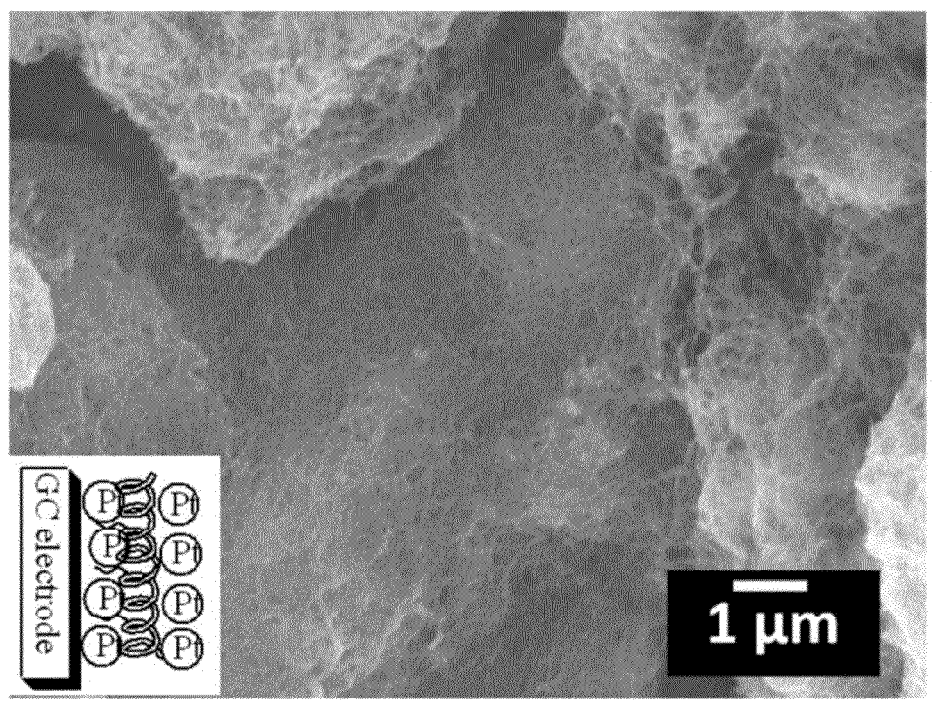
Fig. 12 – conti.

(a)

(b)

(a)

(b)

METHOD FOR MAKING CARBON NANOTUBE-LOADED ELECTRODE, CARBON NANOTUBE-LOADED ELECTRODE MADE BY THE METHOD, AND APPLICATIONS THEREOF

FIELD OF THE INVENTION

The present invention relates to a method for fabricating a carbon nanotube-loaded electrode. The present invention also relates to a carbon nanotube-loaded electrode made by the method and a chemical chip comprising the carbon nanotube-loaded electrode as a working electrode.

BACKGROUND OF THE INVENTION

In the past decade, nanohybrid materials of carbon nanotubes with metal or metal oxide nanoparticles have been received extensive attention, which can be used in various applications such as gas sensors, supercapacitor electrodes, catalyst supports, and antimicrobial therapies. To enhance the efficacies of carbon nanotubes, dendrimers, which encapsulated Au nanoparticle, for example, have been adhered on the surface of multiwalled carbon nanotubes (MWCNTs) via the electrostatic attraction between the positively charged dendrimers and the negatively charged surface of MWCNTs (Herrero et al., *ACS Nano* 2010, 4(2), 905-912). However, hybrids constructed by non-covalent bonds might be affected by the external conditions like temperature, pH and additives and the attraction between the components might be released from such hybrids, depending on a variation of conditions. On the other hand, covalently functionalized dendrimers on MWCNTs as scaffolds have been utilized for in-situ immobilization of metal and metal oxide nanoparticles on them (Lu et al., *Phys. Chem. C* 2007, 111, 2416; and Lu et al., *J. Phys. Chem. C* 2007, 111, 8459). However, the in-situ synthesized metal nanoparticles have inhomogeneously distributed on the MWCNTs modified with dendrimers, which may decrease the desired efficacies of the MWCNTs. Therefore, a procedure to accomplish a uniform attachment of nanoparticles on carbon nanotubes is desired.

Among the various applications of carbon nanotubes, for example, carbon nanotube (CNT)/metal nanoparticle hybrid-modified electrodes have been developed for uses as fuel-cell catalyst and biosensor. For example, electrocatalysts for direct methanol fuel cell (DMFC) were prepared by electrodeposition of platinum nanoparticles (PtNPs) on MWCNT/Nafion and single walled carbon nanotube (SWCNT)/Nafion electrodes using Nafion as binder (Wu et al., *J. Power Sources* 2007, 174, 148-158); however, the preparation technique requires the costly and special equipment. In addition, a Pt-CNT/glucose biosensor was also developed by incorporation of glucose oxidase (GOx) on a Pt-CNT electrode using a $Pt_{nano}/SiO_2$ composite matrix as a binder; however, its stability after the storage for a few days decreased due to the release of GOx which is not incorporated within the $Pt_{nano}/SiO_2$ composite matrix (Yang et al., *Biosensors and Bioelectronics* 2006, 21, 1125-1131). Therefore, there is still a need to have a simple and low-cost method to prepare an effective electrode, which particularly reveals high durability, reactivity and stability and is useful in, for example, electrochemical sensing systems.

BRIEF SUMMARY OF THE INVENTION

The present invention is based on the unexpected findings that nanohybrid materials of metal nanoparticles-encapsulated dendrimer covalently bound to the surface of carbon nanotubes can be successfully loaded on electrodes via covalent binding, and the electrodes thus prepared possess high durability, reactivity and stability. Specifically, it is found that the chemical (covalent) immobilization of pre-prepared metal nanoparticles-encapsulated dendrimer on carbon nanotubes can offer preferable nanohybrid materials with excellently stable and homogenously distributed metal nanoparticles on the carbon nanotubes.

In one aspect, the present invention provides a method for fabricating a carbon nanotube-loaded electrode, comprising (a) providing metal nanoparticles-encapsulated dendrimer having a first functional group, and carbon nanotubes having a second functional group, (b) reacting the metal nanoparticles-encapsulated dendrimer with the carbon nanotubes to form a first covalent bond between the first functional group of the metal nanoparticles-encapsulated dendrimer and the second functional group of the carbon nanotubes in the presence of a first condensing agent so as to produce hybrid carbon nanotubes having a third functional group;

(c) providing a metal electrode coated with a self-assembled monolayer (SAM) having a fourth functional group; and (d) reacting the hybrid carbon nanotubes with the metal electrode to form a second covalent bond between the third functional group of the hybrid carbon nanotubes and the fourth functional group of the metal electrode in the presence of a second condensing agent so as to produce the carbon nanotube-loaded electrode.

In particular embodiments, the first covalent bond is an amide bond or an ester bond. In particular embodiments, the second covalent bond is an amide bond or an ester bond.

In a certain embodiment, the method of the invention comprises the steps of:

(a) providing Pt nanoparticles-encapsulated dendrimer (DEN(PtNP)s) having a first amine group, and acidified carbon nanotubes having a carboxylic acid group, (b) reacting DEN(PtNP)s with the acidified carbon nanotubes to form a first amide bond between the first amine group of DEN(PtNP)s and the carboxylic acid group of the acidified carbon nanotubes in the presence of a first condensing agent so as to produce hybrid carbon nanotubes (CNT/DEN (PtNP)s) having a second amine group;

(c) providing a gold electrode coated with a self-assembled monolayer (SAM) having a carboxylic acid group; and (d) reacting the CNT/DEN(PtNP)s with the gold electrode to form a second amide bond between the second amine group of the CNT/DEN(PtNP)s and the carboxylic acid group of the gold electrode in the presence of a second condensing agent so as to produce the carbon nanotube-loaded electrode.

In another aspect, the present invention provides a carbon nanotube-loaded electrode, comprising (a) a metal electrode coated with a self-assembled monolayer (SAM); and (b) hybrid carbon nanotubes comprising metal nanoparticles-encapsulated dendrimer covalently immobilized on carbon nanotubes via a first covalent bond, wherein the hybrid carbon nanotubes are covalently immobilized on the metal electrode via a second covalent bond.

Also provided is a chemical chip comprising a carbon nanotube-loaded electrode as described herein as a working electrode and one or more chemical reaction molecules adsorbed on a surface of the electrode. For example, the one or more chemical reaction molecules can be enzymes such as acetylcholine esterase (AchE), choline oxidase (ChO) and peroxidase (POD).

It is believed that a person of ordinary knowledge in the art to which the present invention belongs can utilize the present invention to its broadest scope based on the descriptions herein with no need of further illustration. Therefore, the following descriptions should be understood as of demonstrative purpose instead of limitative in any way to the scope of the present invention.

BRIEF DESCRIPTION OF THE SEVERAL VIEWS OF THE DRAWINGS

For the purpose of illustrating the invention, there are shown in the drawings embodiments which are presently preferred. It should be understood, however, that the invention is not limited to the preferred embodiments shown.

DETAILED DESCRIPTION OF THE INVENTION

Figure 1:
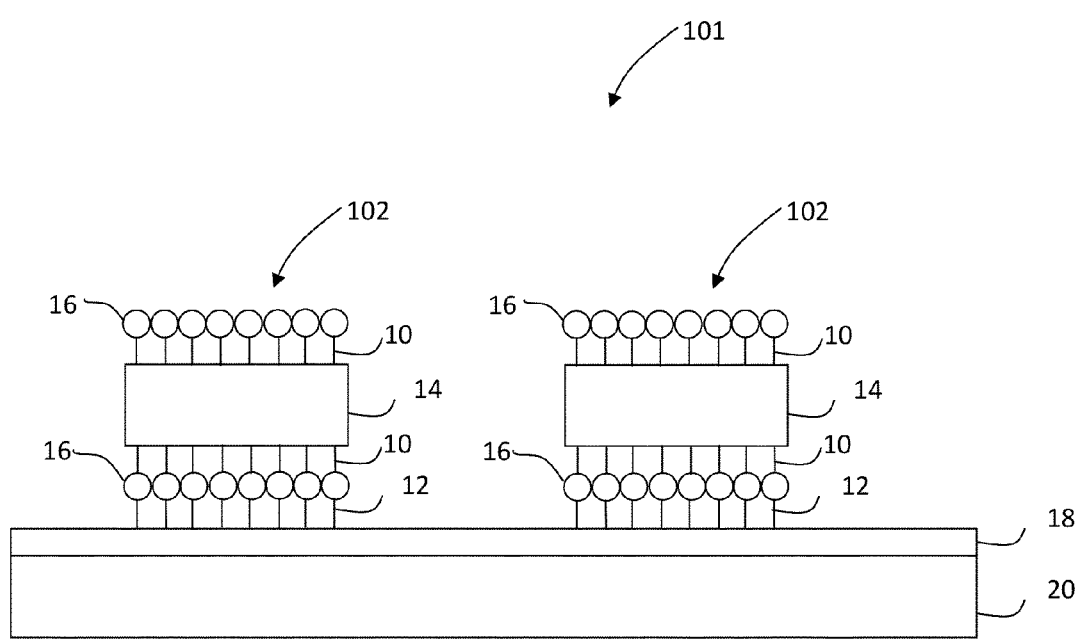
FIG. 1 shows a diagram illustrating the structure of the carbon nanotube-loaded electrode of the invention.

Unless defined otherwise, all technical and scientific terms used herein have the same meaning as commonly understood by a person skilled in the art to which this invention belongs. All publications mentioned herein are incorporated herein by reference to disclose and describe the methods and/or materials in connection with which the publications are cited.

As used herein, the singular forms "a", "an", and "the" include plural referents unless the context clearly dictates otherwise. Thus, for example, reference to "a sample" includes a plurality of such samples and equivalents thereof known to those skilled in the art.

In one aspect, the present invention provides a method for fabricating a carbon nanotube-loaded electrode, comprising:

(a) providing metal nanoparticles-encapsulated dendrimer having a first functional group, and carbon nanotubes having a second functional group, (b) reacting the metal nanoparticles-encapsulated dendrimer with the carbon nanotubes to form a first covalent bond between the first functional group of the metal nanoparticles-encapsulated dendrimer and the second functional group of the carbon nanotubes in the presence of a first condensing agent so as to produce hybrid carbon nanotubes having a third functional group;

(c) providing a metal electrode coated with a self-assembled monolayer (SAM) having a fourth functional group; and (d) reacting the hybrid carbon nanotubes with the metal electrode to form a second covalent bond between the third functional group of the hybrid carbon nanotubes and the fourth functional group of the metal electrode in the presence of a second condensing agent so as to produce the carbon nanotube-loaded electrode.

The term "metal nanoparticles-encapsulated dendrimer" as used herein refer generally to one dendrimer molecule entraps one or more metal nanoparticles. Metal nanoparticles can be nanoparticles of metals e.g. silver (Ag), gold (Au), platinum (Pt), palladium (Pd), copper (Cu), cobalt (Co), chromium (Cr) and nickel (Ni) atoms, or nanoparticles of metal compounds e.g. CuO, $ZnO_2$, $TiO_2$, $Al_2O_3$, $SiO_2$, PbS and MgO. The metal nanoparticles-encapsulated dendrimer can be prepared by mixing metal nanoparticles with dendrimer molecules.

Dendrimer molecules are highly branched polymers with a three-dimensional structure. These molecules are composed of an initiator core, interior layers of repeating units, and multitudinous terminal groups. They are classified by the number of branches and terminal groups (e.g. carboxylic acid groups, hydroxyl groups or amine groups). Various cores and units can be used, which can change the properties and shape of the dendrimers. Dendrimer molecules useful in the invention can be based on, for example, polyester, polyether, polythioether, polyamide, polyetherketone, polyalkylene imine, polyamido amine (PAMAM), polyether amide, polyarylene, polyalkylene, aromatic polyalkylene, polyaryl acetylene and/or phosphorus- or silicon-containing polymers or combinations thereof. In a certain example, dendrimer molecules having amine terminal groups such as polyamido amine (PAMAM) dendrimers are used in the invention.

The metal nanoparticles-encapsulated dendrimer as used in the invention can be prepared by reducing a metal precursor in a condition allowing synthesis of metal nanoparticles in the presence of a dendrimer molecule.

The metal precursor as used herein refers to a precursor material that comprises a metal in an oxidation state greater than zero (e.g. $Au^+$, $Au^{+3}$, $Pt^{+4}$, $Pt^{2+}$, $Ag^+$, $Pd_{2+}$, $Cu^{2+}$, $Co^{2+}$, $Cr^{2+}$, $Cr^{3+}$, $Ni^{2+}$) and is capable of being reduced to form the metal atom. In one example, a gold salt, including but not limited to, $HAuCl_4$, $NaAuCl_4$, $AuCl_3$', $NaAuBr_4$, $KAuCl_4$, and hydrates or solvates thereof, may be used as a gold precursor in the present invention. In another example, a platinum salt, including but not limited to, $Na_2PtCl_6$, $Na_2PtCl_4$, $H_2PtCl_4$, $H_2PtCl_6$, and hydrates or solvates thereof, may be used as a gold precursor in the present invention. Any reducing agent known in the art can be used in the invention, such as sodium borohydride ($NaBH_4$), citric acid, lithium aluminum hydride ($LiAlH_4$), hydrogen peroxide ($H_2O_2$). Preferably, the condition is adjusted to have a pH range from 2 to 7, more preferably at about 4. General synthesis of metal nanoparticles in the presence of a dendrimer molecule has been described in, for example, the metal precursor was added into the dendrimer solution. The metal-dendrimer complex was stirred for a period of time then a freshly prepared $NaBH_4$ was added to the solution of metal-dendrimer complex. The change in color of the solution indicates the formation of metal nanoparticles-encapsulated dendrimer (Herrero et al., *ACS Nano* 2010, 4(2), 905-912).

In one particular embodiment of the invention, a dendrimer molecule having amine terminal groups is used to prepare the metal nanoparticles-encapsulated dendrimer as described herein. Preferably, the metal precursor are mixed with the dendrimer molecule at a molar ratio of the metal precursor to the amine terminal groups of the dendrimer molecule being 0.5:1 or less, e.g. 0.4:1 or 0.3:1, more preferably 0.2:1 or less, e.g. 0.1:1. It is found that the chemical (covalent) immobilization of pre-prepared metal nanoparticles-encapsulated dendrimer on carbon nanotubes can offer preferable nanohybrid materials with excellently stable and homogeneously distributed metal nanoparticles on the carbon nanotubes (see examples below).

According to the invention, the metal nanoparticles-encapsulated dendrimer has a certain functional group (i.e. a first functional group as described herein), the species of which depends on the terminal functional group of the dendrimers as chosen. For example, when dendrimers with an amine terminal group is chosen, the metal nanoparticles-encapsulated dendrimer prepared by mixing the dendrimers with the metal precursors will have an amine terminal group; when dendrimers with a carboxylic acid group is chosen, the metal nanoparticles-encapsulated dendrimer prepared by mixing the dendrimers with the metal precursors will have a carboxylic acid group.

The term "carbon nanotubes" or "CNTs" as used herein includes any forms of carbon nanotube such as modification of ordinary carbon nanotube and carbon nanotube having various modifications or functionalization (i.e. a second functional group as described herein). Any size and diameter is contemplated as useful for the invention. The synthesis of these carbon nanotubes can be carried out by any method known in the art such as an arc discharge method, a laser ablation method and a chemical vapor deposition (CVD) method. In a particular embodiment of the invention, the carbon nanotubes are acidified to have a carboxylic acid group.

Particularly, the carbon nanotubes can be single wall carbon nanotubes (SWCNT) or multiwall carbon nanotubes (MWCNT). Single wall carbon nanotubes generally have a single wall with an outer diameter of about 0.7 to about 3.0 nm, and aspect ratios of greater than or equal to about 5, specifically greater than or equal to about 100, more specifically greater than or equal to about 1000. The single wall carbon nanotubes are generally closed structures having hemispherical caps at each end of the respective tubes; however, single wall carbon nanotubes having a single open end or both open ends may also be used. The single wall carbon nanotubes generally comprise a central portion, which is hollow, but may be filled with amorphous carbon. In another embodiment, the carbon nanotubes are multiwalled carbon nanotubes. These multiwall carbon nanotubes generally have an outer diameter of about 3.5 to about 500 nm, and aspect ratios of greater than or equal to about 5, specifically greater than or equal to about 100, more specifically greater than or equal to about 1000. The multiwall carbon nanotubes like the single wall carbon nanotubes can be closed structures having hemispherical caps at each end of the respective tubes or can have a single open end or both open ends. The multiwall carbon nanotubes also can comprise a central portion, which is hollow, but may be filled with amorphous carbon. The carbon nanotubes may be functionalized on either a sidewall, a hemispherical endcap or on both the side wall as well as the hemispherical endcap. The carbon nanotubes can be uniformly or non-uniformly substituted.

To conduct the method of the invention, metal nanoparticles-encapsulated dendrimer having a first functional group are reacted with carbon nanotubes having a second functional group to form a first covalent bond between the first functional group of the metal nanoparticles-encapsulated dendrimer and the second functional group of the carbon nanotubes in the presence of a first condensing agent so as to produce hybrid carbon nanotubes having a third functional group.

According to the invention, the hybrid carbon nanotubes thus produced have the structure where metal nanoparticles-encapsulated dendrimer are covalently immobilized on the carbon nanotubes via the first covalent bond, which is formed between the first functional group of the metal nanoparticles-encapsulated dendrimer and the second functional group of the carbon nanotubes, in the presence of a first condensing agent (the first condensation reaction). Typically, the first covalent bond is an amide bond or an ester bond. In certain embodiments, the first functional group of the metal nanoparticles-encapsulated dendrimer is a hydroxyl group or an amine group, and the second functional group of the carbon nanotubes is a carboxylic acid group. Any suitable condensing agent can be used in this invention. Examples of the condensing agent include but are not limited to 1-[3-(dimethylamino)propyl]-3-ethylcarbodiimide hydrochloride (EDAC) or N,N'-dicyclohexylcarbodiimide.

According to the invention, the hybrid carbon nanotubes thus produced have a third functional group, which is normally the unreacted group of the dendrimers in the first condensation reaction. Specifically, the third functional group of the hybrid carbon nanotubes can be a carboxylic acid group or an amine group.

The term "self-assembled monolayer (SAM)" as used herein refers to a thin monolayer having an active functional group which can spontaneously adsorbed on the surface of a particular substrate (e.g., a metal or a metal oxide) to form chemical bonds between the surface active molecules and the substrate. The shape and physical properties of the self-assembled monolayer can be controlled and modified on a molecular level.

According to the invention, a metal electrode coated with a self-assembled monolayer (SAM) having a fourth functional group is provided, which is then reacted with the hybrid carbon nanotubes as described above to carry on the second condensation reaction where a second covalent bond is to be formed between the third functional group of the hybrid carbon nanotubes and the fourth functional group of the metal electrode. Typically, the second covalent bond is an amide bond or an ester bond. In certain embodiments, the third functional group of the hybrid carbon nanotubes is a carboxylic acid group or an amine group, and fourth functional group of the metal electrode is a carboxylic acid group or an amine group. Any suitable condensing agent can be used in this invention. Examples of the condensing agent include but are not limited to 1-[3-(dimethylamino)propyl]-3-ethylcarbodiimide hydrochloride (EDAC) or N,N'-dicyclohexylcarbodiimide.

The metal electrode can be made of any proper metal or alloy thereof as known in the art. Specific examples of the metal electrode are platinum (Pt), palladium (Pd), indium (In), gold (Au), carbon, glassy carbon and an alloy thereof. In a certain example, the metal electrode is a gold (Au) electrode. The metal electrode can be made by a method known in the art e.g. screen-printed technology. In a certain example, the metal electrode is a screen-printed circular gold (SPCG) or screen-printed circular glassy carbon (SPCGC) electrode.

In a preferred embodiment, the method of the invention comprises the steps as follows:

(a) providing Pt nanoparticles-encapsulated dendrimer (DEN(PtNP)s) having a first amine group and acidified carbon nanotubes having a carboxylic acid group, (b) reacting DEN(PtNP)s with the acidified carbon nanotubes to form a first amide bond between the first amine group of DEN(PtNP)s and the carboxylic acid group of the acidified carbon nanotubes in the presence of a first condensing agent so as to produce hybrid carbon nanotubes (CNT/DEN(PtNP)s) having a second amine group;

(c) providing a gold electrode coated with a self-assembled monolayer (SAM) having a carboxylic acid group; and (d) reacting the CNT/DEN(PtNP)s with the gold electrode to form a second amide bond between the second amine group of the CNT/DEN(PtNP)s and the carboxylic acid group of the gold electrode in the presence of a second condensing agent so as to produce the carbon nanotube-loaded electrode.

In a certain example, the metal nanoparticles-encapsulated dendrimer (DEN(PtNP)s) is prepared by reducing Pt precursor in a condition allowing synthesis of Pt nanoparticles in the presence of a polyamidoamine (PAMAM) dendrimer molecule having amine terminal groups. Preferably, the Pt precursor and the amine terminal groups of the dendrimer molecule are present at a molar ratio of being 0.5:1 or less e.g. 0.4:1 or 0.3:1, more preferably 0.2:1 or less, e.g. 0.1:1.

By conducting the two condensation reaction as described above, a carbon nanotube-loaded electrode is fabricated. The carbon nanotube-loaded electrode has been evaluated to have high durability, reactivity and stability (see examples below).

Therefore, the present invention also provides a carbon nanotube-loaded electrode comprising (a) a metal electrode coated with a self-assembled monolayer (SAM); and (b) hybrid carbon nanotubes comprising metal nanoparticles-encapsulated dendrimer covalently immobilized on carbon nanotubes via a first covalent bond, wherein the hybrid carbon nanotubes are covalently immobilized on the metal electrode via a second covalent bond.

FIG. 1 shows a diagram illustrating the structure of one embodiment of the carbon nanotube-loaded electrode of the invention 101, where the hybrid carbon nanotubes (CNT/DEN(NP)s) 102 comprising metal nanoparticles-encapsulated dendrimer (DEN(NP)s) 16 covalently immobilized on carbon nanotubes 14 via the first covalent bond 10 are covalently immobilized on the metal electrode 20 coated with SAM 18 via the second covalent bond 12.

The carbon nanotube-loaded electrode of the invention can be applied in various electrochemical applications. In one embodiment, the carbon nanotube-loaded electrode can be used to fabricate an electrochemical sensor.

Figure 2:
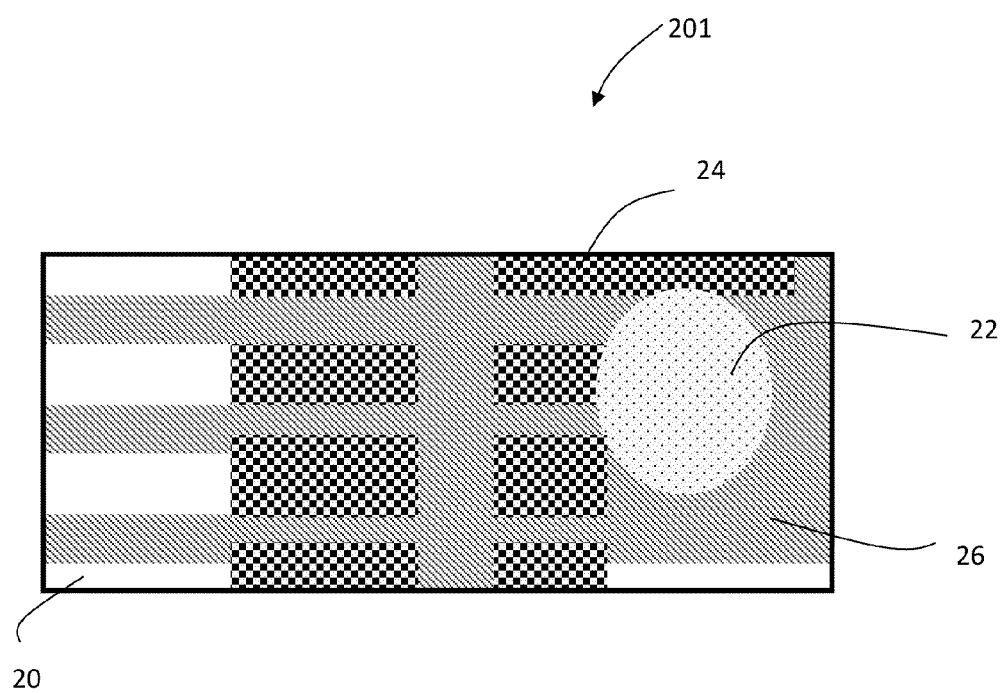
FIG. 2 shows a diagram illustrating a disposable electrochemical printed (DEP) chip according to one embodiment of the invention.

Therefore, the present invention further provides an electrochemical sensor comprising a carbon nanotube-loaded electrode as described herein as a working electrode and one or more chemical reaction molecules adsorbed on a surface of the electrode. The one or more chemical reaction molecules can be an enzyme, antigen or antibody. Typically, the one or more chemical reaction molecules are enzymes, such as acetylcholine esterase (AchE), choline oxidase (ChO) and peroxidase (POD). The certain examples of the electrochemical sensor of the invention can be used for detection of the organophsphate pesticide, Diazinon oxon (DZN). Typically, the sensor is a disposable electrochemical printed (DEP) chip with the carbon nanotube-loaded electrode as described herein (which can be a screen-printed circular gold (SPCG) or screen-printed circular glassy carbon (SPCGC) electrode) as a working electrode, and further a reference electrode (e.g. Ag/AgCl, KCl-saturated) and a counter electrode (e.g. graphite). FIG. 2 shows a diagram illustrating a disposable electrochemical printed (DEP) chip 201 according to one embodiment of the invention, which comprises a substrate 20, a working electrode 22, reference electrode 24, and counter electrode 26.

The present invention is further illustrated by the following examples, which are provided for the purpose of demonstration rather than limitation.

EXAMPLES

Materials and Methods
Reagents and Materials
MWCNT, O,O-diethyl 0-2-isopropyl-6-methyl(pyrimidine-4-yl)phosphorothioate (DZN) and NaBH$_4$ were purchased from Wako Pure Chemical Industries Ltd. AChE, choline oxidase (ChO), Peroxidase (POD) and acetylcholine chloride (ACh) enzymes, amine-terminated G4 PAMAM dendrimer (10 wt % in methanol), $Na_2PtCl_6$, 1-[3-(dimethylamino)propyl]-3-ethylcarbodiimide hydrochloride (EDAC) and 4-mercaptobenzoic acid (MBA) (97%) were products from Aldrich Chemical Co. Potassium ferricyanide (99%) ($K_4Fe(CN)_6 \cdot 3H_2O$) was purchased from ACROS organics. Sulfuric acid (98%), nitric acid (60%), methyl alcohol and ethyl alcohol were commercial products and used as received. Ultra pure water was used throughout whole experiments. Disposable electrochemical printed (DEP) chips (with screen-printed circular gold (SPCG) or screen-printed circular glassy carbon (SPCGC) working electrode) were purchased from BioDevice Technology.

Measurements (TEM, Raman Spectra, AFM and NMR)

Transmission electron microscopic (TEM) images were taken using a Hitachi H-7000 equipped with a CCD camera and an electron diffraction (ED) attachment, operating at a voltage of 100 kV. High resolution transmission electron micrographs (HRTEM) were obtained using a Philips Tecnai F20 G2 FEI-TEM. The specimens for TEM and HRTEM were prepared by dropping sample solutions onto carbon-coated copper grids and allowing drying in the air. Thermogravimetric analyses (TGA) of sample powders were performed using a TGA:TA instrument Q500 (Perkin Elmer) under the atmosphere of air with a heating rate of 10° C./min Field emission-scanning electron microscopic (FE-SEM) observation of powders on the carbon tape were performed on a JEOL JSM-6500F and operated at a voltage of 20 kV. IR spectra were recorded for sample powders on an FTIR spectrometer (Nicolet, Nexus 670) with an ATR mode. Raman spectra were recorded on a Raman Microscope, Kaiser Optical Systems with a laser at an excitation wavelength of 785 nm. The specimens for Raman measurement were fabricated on the glass microfiber filter (Whatman No. 1) by vacuum-filtering and drying at 110° C. overnight. Ultra violet-visible-near infrared (UV-VIS-NIR) absorption spectroscopic measurements were performed on a Jasco V-670 series UV spectrometer with a 1-mm quartz cell. The specimens for UV-VIS-NIR spectra were dispersions in ethanol under a sonication. Atomic force microscopic (AFM) observation was performed in air using a Digital Instruments NanoScope III apparatus. Freshly-cleaved mica was used as a substrate. The sample solutions were dropped directly onto the mica surface, and then dried overnight in air at room temperature. Nuclear magnetic resonance (NMR) spectra of samples in $D_2O$ were recorded on a Bruker Avance NMR spectrometer operating at 500.132 MHz for $^1H$.

Example 1

Synthesis of Pt Nanoparticles-Encapsulated Dendrimers (DEN(PtNP)s)

A 0.2 wt % aqueous solution of amine-terminated G4 PAMAM dendrimer was prepared by diluting a 10 wt % methanol solution of the dendrimer with water. Then 1 $cm^3$ of freshly prepared aqueous $Na_2PtCl_6$ solution (containing precursor metal ions) was added into 19 $cm^3$ of the 0.2 wt % dendrimer solution. The $Na_2PtCl_6$ solution was mixed with the G4 PAMAM dendrimer solution in a molar ration (denoted by M:D) of 0.1:1 or 0.2:1. The solution of $[PtCl_6]^{2-}$-dendrimer complex was stirred for 3 days and the pH of the solution was adjusted to be 4. After complexation for 3 days, a freshly prepared aqueous 0.3 M NaOH solution of $NaBH_4$ (of a 10-fold mole of $Na_2PtCl_6$) was added to the solution of $[PtCl_6]^{2-}$-dendrimer complex. The light yellow solution of $[PtCl_6]^{2-}$-dendrimer complex immediately turned brown, indicating the formation of DEN(PtNP)s.

Figure 3:
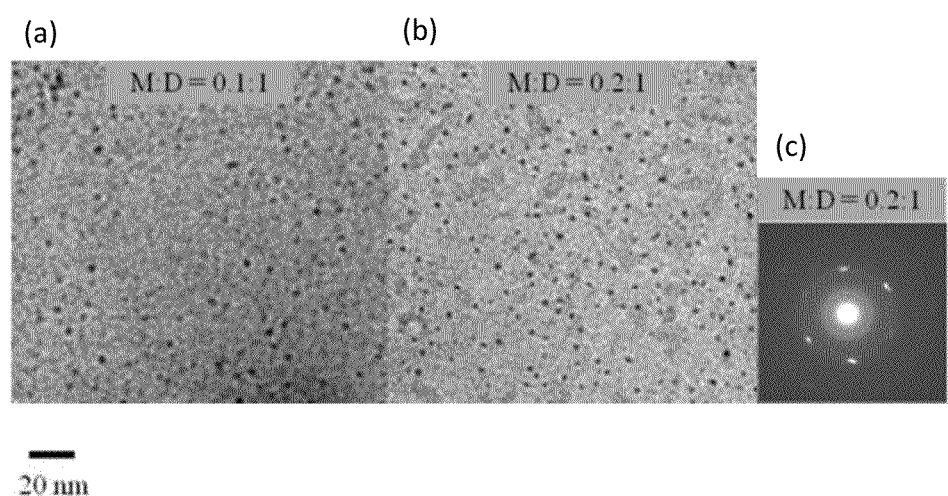
FIG. 3 shows transmission electron microscopic (TEM) images and an electron diffraction (ED) pattern of DEN(PtNP)s at different Pt ion: primary amine group of dendrimer (M:D) ratios, wherein (a) refers to the ratio of 0.1:1, (b) refers to the ratio of 0.2:1, and (c) refers to the ED pattern image of (b).

Their TEM images are shown in FIG. 3. Homogenously dispersed Pt nanoparticles can be observed at both of the M:D ratios of 0.1:1 and 0.2:1. Their particle sizes were in the range of 2-3 nm. In addition, the electron diffraction pattern of DEN(PtNP)s at the M:D ratio of 0.2:1 showed a series of spots, as shown in FIG. 3. The spots provide direct evidence that (PtNP)s in DEN(PtNP)s are crystalline. The calculated lattice constant is 3.92 Å, confirming the crystal structure of (PtNP)s to be a face-centered cubic (FCC) (Lim et al., *Nano Lett.* 2010, 10, 964).

Figure 4:
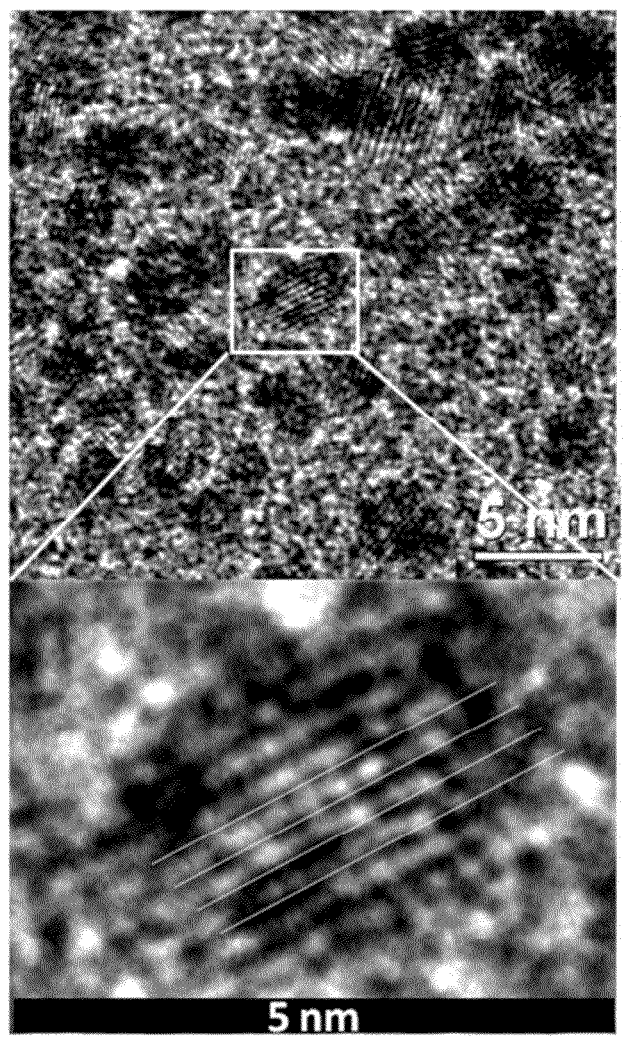
FIG. 4 shows high resolution (HR)-TEM images of DEN (PtNP)s at M:D=0.2:1.

FIG. 4 shows HR-TEM images of DEN(PtNP)s at M:D=0.2:1. It was found that (PtNP)s have an average size of 2-3 nm. In addition, it was observed that each Pt nanoparticle revealed a crystal array pattern, where the spacing between each array was 2.68 Å and the calculated lattice constant from the spacing between arrays was 3.79 Å. This value is consistent with the calculated lattice constant value from the electron diffraction pattern described above.

Figure 5:
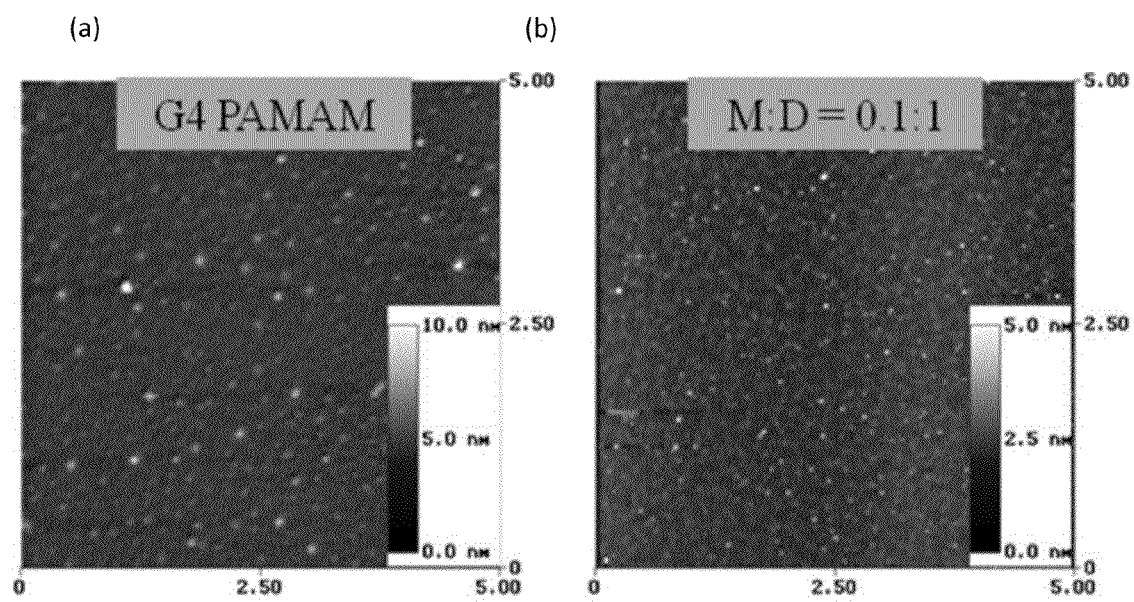
FIG. 5 shows AFM images of DEN and DEN(PtNP)s wherein (a) refers to $NH_2$-terminated fourth generation poly (amido amine) (G4 PAMAM) dendrimer; and (b) refers to DEN(PtNP)s at M:D=0.1:1.

AFM has been widely used to investigate the morphology of nanoparticles deposited onto flat surface (Gu et al., *Langmuir* 2005, 3122; Deng et al., *Am. Chem. Soc.* 2005, 127, 1744; and Imae et al., *Langmuir* 1999, 15, 4076). FIG. 5 shows AFM topographic images of G4 PAMAM dendrimer and DEN(PtNP)s at M:D ratios=0.1:1 (0.2:1 not shown herein). A typical image of G4 PAMAM dendrimer reveals that a lot of small dendrimer molecules deposit onto mica surface. It can be also observed that DEN(PtNP)s at M:D ratios being 0.1:1 and 0.2:1 appeared to be substantially uniform in size and well dispersed on mica surface. These observations are consistent with the TEM results described above.

Figure 6:
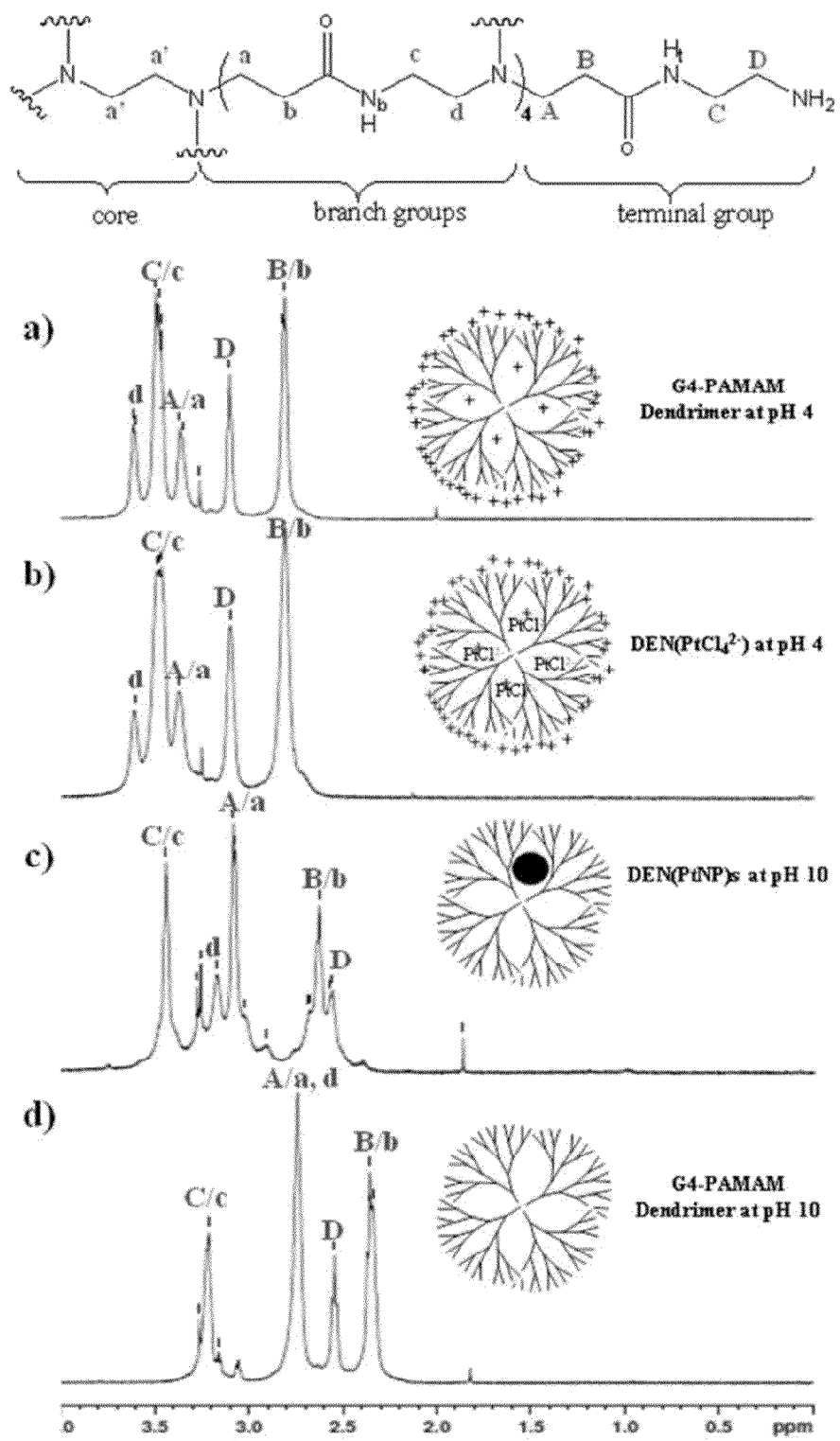
FIG. 6 shows $^1$H-NMR spectra of G4 PAMAM dendrimers in $D_2O$. (a) G4 PAMAM dendrimer at pH 4, (b) complex of G4 PAMAM dendrimer with $PtCl_6^{2-}$ at M:D=0.2:1 and pH 4, (c) DEN(PtNP)s at M:D=0.2:1 and pH 10, (d) G4 PAMAM dendrimer at pH 10.

NMR spectroscopy is one of the powerful techniques to investigate the intermolecular interactions between functional groups of dendrimers and metal ions (Gni et al., *ACS Nano* 2011, 5, 3456; and Victoria Gomez et al., *J. Am. Chem. Soc.* 2009, 131, 341). The complexation of $NH_2$-terminated G4 PAMAM dendrimer and $PtCl_6^{2-}$ was carried out at pH 4 but the pH of the reaction solution shifted to 10 after DEN (PtNP)s were produced. Then the $^1H$-NMR spectra of these samples in $D_2O$ were measured and compared with the spectra of $NH_2$-terminated G4 PAMAM dendrimer at pH 4 and 10, as shown in FIG. 6. In the $^1H$-NMR spectrum for a complex of $NH_2$-terminated G4 PAMAM dendrimer and $PtCl_6^{2-}$ at pH 4 (FIG. 6(b)), the triplet near 3.5 ppm is attributed to the protons of methylene groups C/c adjacent to amide group. The resonances from the $NCH_2$ type methylene groups A/a and d appear as broad triplets near 3.35 and 3.6 ppm, respectively. A broad triplet at 3.1 ppm is assigned to the protons of methylene group D adjacent to the terminal $NH_2$. The remaining broad triplet near 2.8 ppm is attributed to methylene groups B/b adjacent to C=O of amide group. No proton signals of protonated primary and tertiary amine appear due to the exchange of proton to deuterium. These features of the $^1H$-NMR spectrum of the complex of $NH_2$-terminated G4 PAMAM dendrimer and $PtCl_6^{2-}$ at pH 4 are very similar to those of $NH_2$-terminated G4 PAMAM dendrimer at an acidic condition (FIG. 6(a)) (Manna et al., *Chem. Mater.* 2001, 13, 1674). However, the slight broadening of the signals of all dendrimer protons was observed. This might be due to the influence to the proton motion of $NH_2$-terminated G4 PAMAM dendrimer because of the occupation of dendrimer cavity by $PtCl_6^{2-}$. These results indicate that the encapsulated $PtCl_6^{2-}$ has no strong influence to the dendrimer structure and no effective interaction except electrostatic interaction with dendrimer and the occupation of dendrimer cavity.

FIG. 6(c) shows the $^1$H-NMR spectrum of DEN(PtNP)s. The significant shift to lower field was observed for all proton signals in comparison with the complex of NH$_2$-terminated G4 PAMAM dendrimer and PtCl$_6^{2-}$ or before reduction. The $^1$H-NMR spectrum of DEN(PtNP)s is also different from NH$_2$-terminated G4 PAMAM dendrimer at pH 10 (FIG. 6(d)) (Manna et al., Chem. Mater. 2001, 13, 1674). Especially, the chemical shifts of A/a, B/b and C/c seem to be the superposition of sharp and broad signals. These changes in the chemical shifts and the signal shapes of the $^1$H-NMR spectra indicate the restriction of proton motion in interior or exterior of dendrimer. These might be due to the encapsulation of (PtNP)s within NH$_2$-terminated G4 PAMAM dendrimers, which was confirmed by UV-VIS absorption observation described above.

Example 2

Immobilization of DEN(PtNP)s on Acid-Treated MWCNTs

Figure 7:
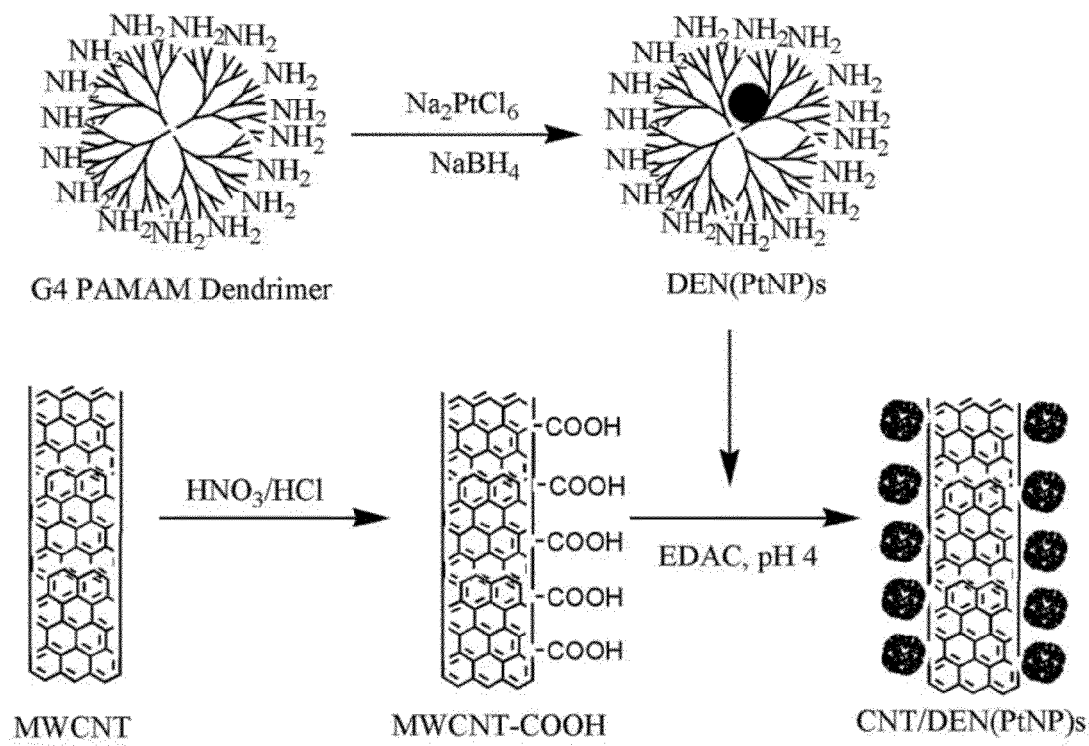
FIG. 7 shows schematic representation of immobilization of DEN(PtNP)s on MWCNTs.

DEN(PtNP)s as-prepared in Example 1 were attached to MWCNTs by using EDAC as a condensing agent for amide bonding between carboxylic acid group on acid-treated MWCNTs and amine peripheral group on the DEN(PtNP)s as shown in FIG. 7. Briefly, MWCNTs were purified by refluxing in concentrated HNO$_3$ for 1 day as previously reported (Lee et al., Carbon 2007, 45, 203). The purified MWCNTs were then treated with HNO$_3$/H$_2$SO$_4$ (3:1 v/v) for 2 days to load carboxylic acid groups on the surface of MWCNTs. 20 mg of the acid-treated MWCNTs were dispersed in 5 cm$^3$ of DEN(PtNP)s solution and the mixtures were stirred for 1 h at room temperature. Subsequently, the mixtures were added EDAC and vigorously stirred at room temperature for 2 days to allow amide formation. The dispersion was then filtered using a Millipore membrane (PTFE, pore size=0.2 μm) and the filtered residue was rinsed with water and dried overnight at 110° C.

Figure 8:
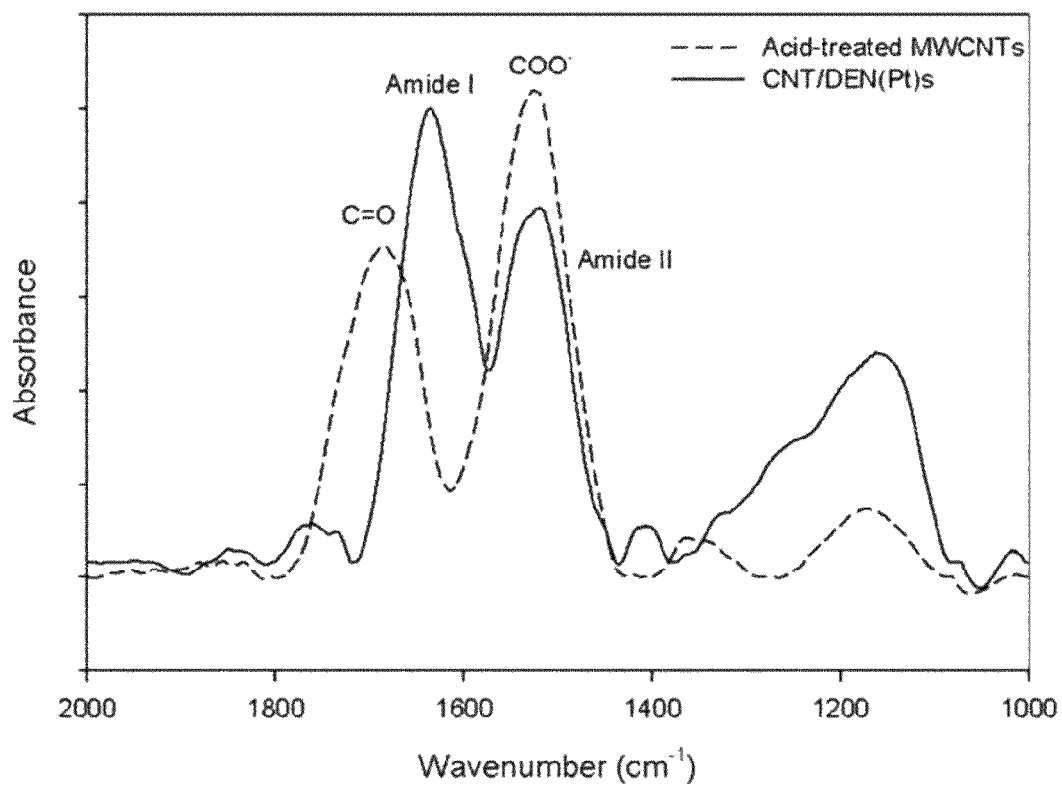
FIG. 8 shows infrared (IR) absorption spectra of an acid-treated MWCNT and a CNT/DEN(PtNP)s hybrid at M:D=0.2:1.

The covalent bonding of DEN(PtNP)s on the surface of MWCNTs was confirmed by an IR absorption spectroscopy, as shown in FIG. 8. Acid-treated MWCNTs exhibited IR absorption bands around 1685 and 1520 cm$^{-1}$ attributed to the C=O and COO$^-$ stretching vibration modes, respectively, of carboxyl group. However, it was found that the intensity of the C=O and COO$^-$ bands of the acid-treated MWCNTs significantly decreased after the immobilization reaction of DEN(PtNP)s. Instead, the spectrum of CNT/DEN(PtNP)s showed the presence of new absorption bands at 1635 and 1517 cm$^{-1}$ attributed to the amide I and amide II vibration modes, respectively, of amide bond (Lu et al., J. Phys. Chem. C 2007, 111, 8459). Thus these results strongly indicate the covalent immobilization of DEN(PtNP)s on the MWCNTs through the amide linkage. The immobilized hybrids are abbreviated as CNT/DEN(PtNP)s hereafter.

Figure 9:
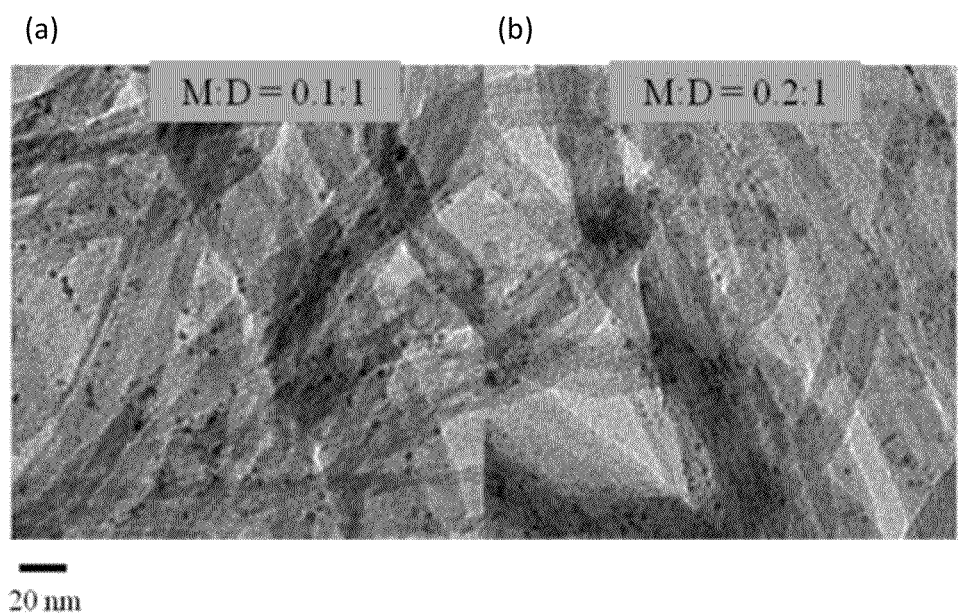
FIG. 9 shows TEM images of CNT/DEN(Pt)s hybrids at different M:D ratios, wherein (a) refers to the ratio of 0.1:1, and (b) refers to the ratio of 0.2:1.

The immobilization and distribution of DEN(PtNP)s on the MWCNTs were confirmed by TEM and SEM. TEM images of CNT/DEN(PtNP)s at different M:D ratios are shown in FIG. 9. It was clearly seen that Pt nanoparticles were successfully immobilized on the MWCNTs. The DEN(PtNP)s are homogeneously attached on the surface of MWCNTs (M:D=0.1:1 and 0.2:1

Figure 10:
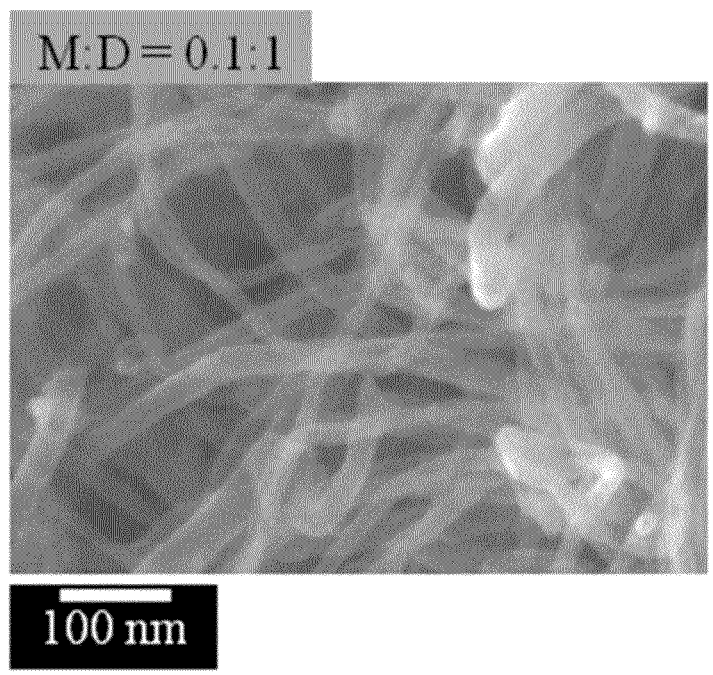
FIG. 10 shows scanning electron microscopic (SEM) images of CNT/DEN(PtNP)s hybrids at M:D=0.1:1 and 0.4:1.

The surface morphology of CNT/DEN(PtNP)s hybrids were also observed by FE-SEM as shown in FIG. 10. It was found that the hybrid at M:D=0.1:1 displayed rather smooth surface, while the Pt nanoparticles were homogeneously immobilized on its surface as seen in TEM (FIG. 9).

It is concluded that DEN(PtNP) at M:D ratios being 0.1:1 and 0.2:1 can be homogeneously immobilized on the surface of MWCTs.

Example 3

Fabrication of CNT/DEN(PtNP)s on DEP Chips

Figure 11:
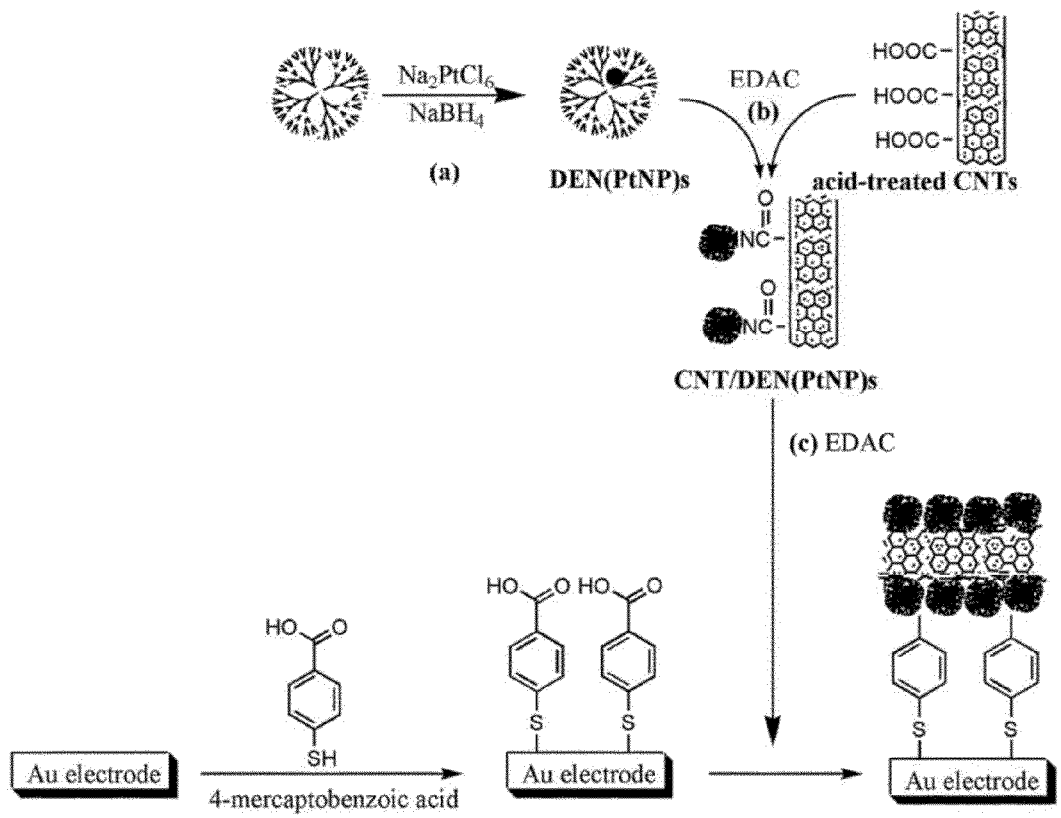
FIG. 11 shows schematic illustration of fabrication of CNT/DEN(PtNP)s on SAM-Au electrode.

DEN(PtNP)s were prepared as shown in FIG. 11 (reaction a); an aqueous Na$_2$PtCl$_6$ solution freshly prepared was added into a 0.2 wt % amine-terminated G4 PAMAM dendrimer solution. The molar ratio of Na$_2$PtCl$_6$ to amine terminal group of G4 PAMAM dendrimer was denoted by M:D. The solution of [PtCl$_6$]$^{2-}$-dendrimer complex was stirred for 3 days and the pH of the solution was adjusted to be 2. Then, a freshly prepared aqueous 0.3 M NaOH solution of NaBH$_4$, which is a 10-fold mole of Na$_2$PtCl$_6$, was added to the solution of [PtCl$_6$]$^{2-}$-dendrimer complex.

CNT/DEN(PtNP)s were prepared by the immobilization of DEN(PtNP)s onto the acid-treated MWCNTs by amidation process as shown in FIG. 11 (reaction b). The acid-treated MWCNTs (20 mg) were dispersed in the DEN(PtNP)s solution (5 cm$^3$) and the mixtures were stirred for 1 h at room temperature. Then, EDAC was added to the mixtures and the mixtures were vigorously stirred at room temperature for 2 days to allow the amide formation. The dispersion was then filtered using a Millipore membrane (PTFE, pore size=0.2 μm). The filtered residue was washed with water several times and dried overnight at 110° C.

Self-Assembled monolayer (SAM) of carboxyl-terminated thiol on Au electrode was fabricated as follows; a SPCG DEP chip was immersed horizontally into an ethanol 20 mM solution of MBA for 24 h at room temperature. After that, excess of MBA on the SPCG electrode was removed by rinsing with ethanol followed by water. Then the SAM-SPCG DEP chip was dried overnight in vacuum oven. For the chemical immobilization of CNT/DEN(PtNP)s onto the SAM-modified electrode, an aqueous 10 mg/cm$^3$ dispersion (10 mm$^3$) of CNT/DEN(PtNP)s was added EDAC and retained overnight on the SAM-SPCG electrode as shown in FIG. 11 (reaction c). The adsorption of CNT/DEN(PtNP)s onto the SPCGC electrode was carried out with the same procedure as the case of SAM-modified SPCG electrode. The surface morphologies of CNT/DEN(PtNP)s on the SAM-SPCG and SPCGC electrodes were characterized by a field emission-scanning electron microscope (FE-SEM) on a JEOL JSM-6500F operated at a voltage of 20 kV.

Figure 12:
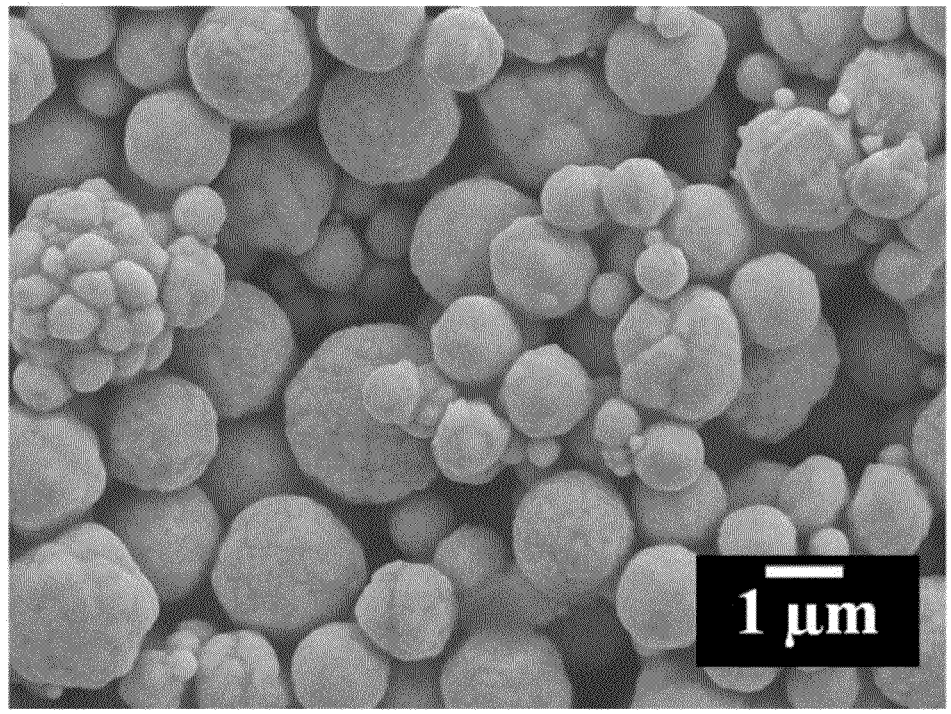
FIG. 12 shows surface morphologies of working electrodes. (a) Bare screen-printed circular gold (SPCG), (b) bare screen-printed circular glassy carbon (SPCGC), (c) CNT/DEN(PtNP)s-loaded SAM-SPCG, (d) CNT/DEN(PtNP)s-loaded SPCGC. DEN(PtNP)s were prepared at M:D=0.2:1.
Figure 12:
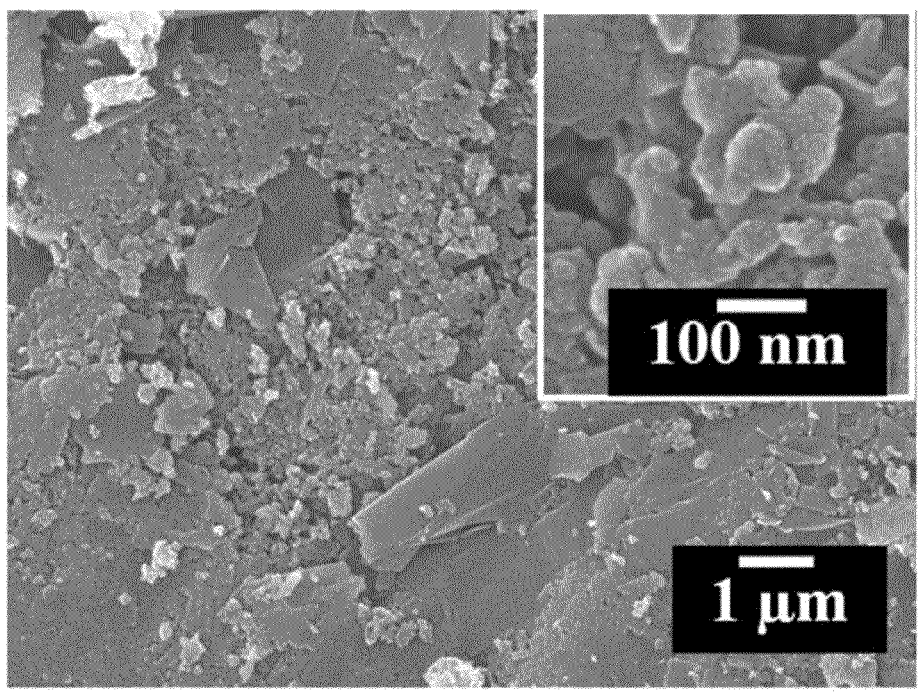

FIG. 12 shows the FE-SEM results, indicating (a) the deposition of spherical gold particles on the SPCG working electrode, and that (b) glassy carbon nanosheets with nanosized voids were observed on the SPCGC working electrode. It was clearly seen in FIG. 12(c) and FIG. 12(d), respectively, that fiber-like structures of CNT/DEN(PtNP)s were successfully fabricated on the SAM-SPCG and SPCGC working electrode surfaces.

Example 4

Durability and Reactivity of CNT/DEN(PtNP)s-Loaded Electrodes

Electrocatalytic activities of CNT/DEN(PtNP)s on the DEP chips were performed with a Hokuto-Denko HZ-3000. The DEP chips are served carbon as a counter electrode, Ag/AgCl as a reference electrode and gold or glassy carbon as a working electrode (SPCG or SPCGC electrode, respectively). The working area of the SPCG and SPCGC electrodes are 3.67 mm$^2$ and 2.64 mm$^2$, respectively. The DEP chips were supported vertically during the cyclic voltammetry (CV) measurement. Electrochemical measurement was carried out in 2 cm$^3$ of a test solution, and the liquid area had to cover the circular working electrode area. The potential of CV was scanned between −0.2 and 1.2 V at a scan rate of 20 mVs$^{-1}$. All measurements were carried out for 20 cycles at room temperature and the data at the 20$^{th}$ cycle was taken up except the analysis on number of cycle. The electrolyte solution was an aqueous 0.5 M H$_2$SO$_4$ solution including 2.0 M CH$_3$OH. Electrical current density (mA/cm$^2$) was calculated by normalizing electrical current (mA) on the working area of the SPCG and SPCGC electrodes.

Durability of CNT/DEN(PtNP)s-loaded SAM-SPCG and SPCGC electrodes can be evaluated from the measurement of 20 CV cycles. The results below show that the CNT/DEN (PtNP)s fibrils still retained their chemical immobilization on the SAM-SPCG electrode surface, and CNT/DEN(PtNP)s still adhered on the SPCGC electrode surface. These observations suggest that G4 PAMAM dendrimers in CNT/DEN (PtNP)s act as strong binders between these hybrids and the SAM-SPCG and SPCGC electrode surfaces.

Figure 13:
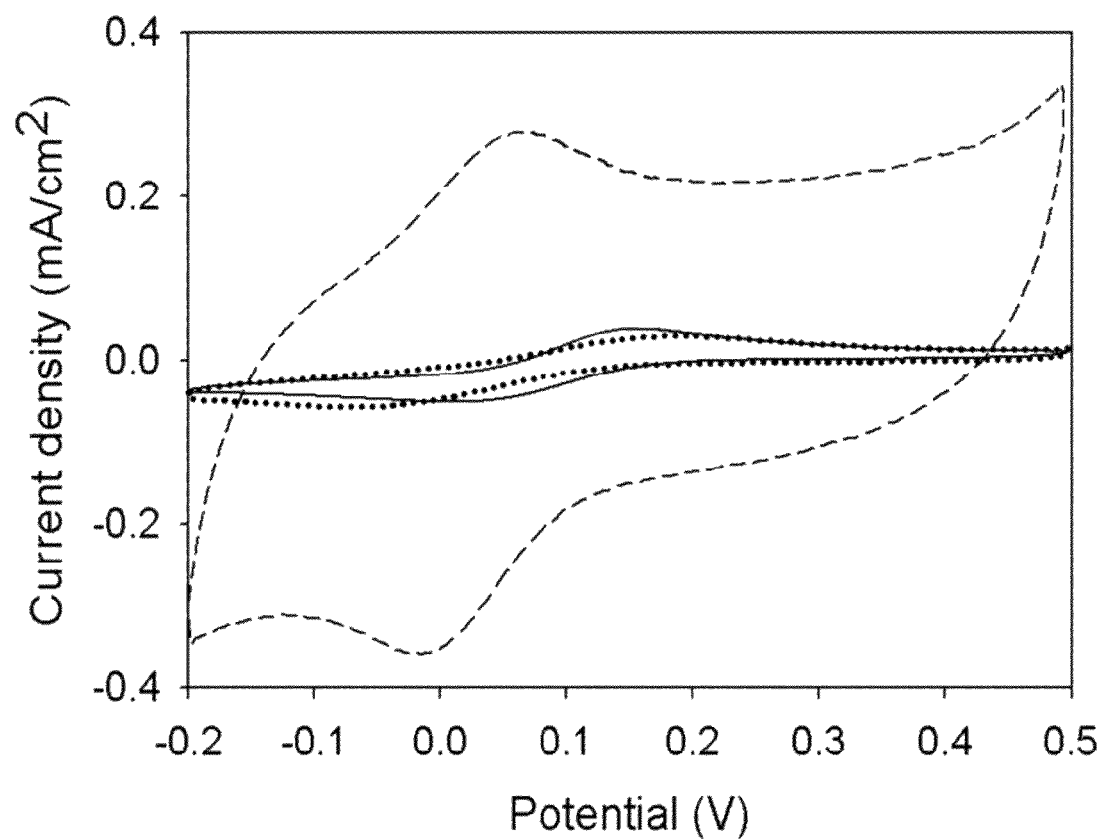
FIG. 13 shows cyclic voltammograms of SPCG electrodes in a 1.0 mM phosphate buffer solution (pH 7.4) of $K_3Fe(CN)_6$. (_____)bare, ( . . . ) SAM-, ( - - - ) CNT/DEN (PtNP)s-loaded SAM. DEN(PtNP)s were prepared at M:D=0.2:1.

For the case of the SPCG working electrode, the SAM of MBA was fabricated to load the carboxyl group as a binding site for CNT/DEN(PtNP)s on the SPCG electrode surface. Therefore, the CV measurement using this electrode (CNT/DEN(PtNP)s-loaded SAM-SPCG electrode) was carried out in a buffer solution of ferricyanide as a redox probe to investigate the electrode reactivity of the modified electrode (Li et al., *Anal. Chem.* 2011, 83, 6426-6430; and Losica et al., *Electrochemistry Communications* 2002, 4, 953-958). CVs of bare, SAM- and CNT/DEN(PtNP)s-loaded (at M:D=0.2:1) SAM-SPCG electrodes in a 1.0 mM phosphate buffer (pH 7.4) solution of K$_4$Fe(CN)$_6$ are shown in FIG. 13. The bare SPCG electrode exhibits a pair of well-defined redox peaks, which was expected to the electron transfer process of this electrode, indicating a reversible process by [Fe(CN)$_6$]$^{4-}$ in a solution phase (Yang et al., *J. Phys. Chem. C.* 2010, 114, 4389-4393). The SAM-SPCG electrode has a similar CV feature to the bare SPCG electrode but slightly lower currents at redox peaks than the bare one. It is known that the current at the surface is generated by the transfer of electrons from the electrode to the redox species. Therefore, the MBA SAM on the SPCG electrode acts as an insulating layer, which can effectively block the electron transfer between the redox species and the electrode and hence reduces the current of redox peaks (Su et al., *Anal. Chem.* 2006, 78, 2651-2657; and Yang et al., *J. Phys. Chem. C.* 2010, 114, 4389-4393).

The potential interval between anodic and cathodic peaks in an electrochemically reversible reaction relates to an electron transfer rate on the electrode which is given by:

$$\Delta Ep = Epa Epc \quad \text{[Equation 2]},$$

Wherein ΔEp is the potential interval between anodic and cathodic peaks, and Epa and Epc are potentials of anodic and cathodic peaks, respectively. The peak-to-peak interval are about 143 mV for the bare SPCG electrode, 248 mV for the SAM-SPCG electrode and 79 mV for the CNT/DEN(PtNP)s-loaded SAM-SPCG electrode. An increase in the peak-to-peak interval for the SAM-SPCG electrode indicates that the electron transfer between the redox species and the electrode surface is blocked.

Once CNT/DEN(PtNP)s were fabricated on the SAM-SPCG electrode, the peak-to-peak interval significantly decreased to 79 mV and the current obviously increased as compared with bare and SAM-SPCG electrodes. Recently, Yu and co-workers (Yang et al., *J. Phys. Chem. C.* 2010, 114, 4389-4393) fabricated the reduced graphene nanosheet film (GNF) on the SAM-modified Au electrode. CV of GNF/SAM Au electrode revealed a pair of well-defined redox peaks with the small peak-to-peak interval (73 mV at 50 mV/sec). The present observation suggests a fast electron transfer process for [Fe(CN)$_6$]$^{4-}$ at the CNT/DEN(PtNP)s-loaded SAM-SPCG electrode as well as at the GNF/SAM Au electrode. The enhancement of the redox current and the shortening of the peak-to-peak interval could be due to the promotion of the electron transfer between the redox species and the electrode attributed to the CNT/DEN(PtNP)s acting as electron transfer stations, where the large π-conjugated system within the CNTs can behave both an electron acceptor and electron donor and the positive charges within the amine-terminated G4 PAMAM dendrimers can exert their uptake ability for the negatively charged [Fe(CN)$_6$]$^{4-}$ ions during redox process. Meanwhile, PtNPs in the CNT/DEN(PtNP)s could also help out to increase the electron transfer ability on the electrode surface (Lu et al., *International Journal of Hydrogen Energy* 2008, 33, 3930-3937). It can be referred that each component in the hybrid of CNT/DEN(PtNP)s contributes to the promotion of the electron transfer between the redox ferricyanide solution and the modified electrode surface. Therefore, the electron transfer at the CNT/DEN(PtNP)s-loaded SAM-SPCG electrode might proceed via two steps, the first between the SPCG electrode and the CNT/DEN(PtNP)s and the second between the CNT/DEN(PtNP)s and the redox species in the solution phase (Yang et al., *J. Phys. Chem. C.* 2010, 114, 4389-4393). The results described above indicate that CNT/DEN(PtNP)s-loaded electrode possesses high durability and reactivity.

Example 5

Electrocatalytic Activity of SAM-SPCG Electrodes Toward Methanol Oxidation

Figure 14:
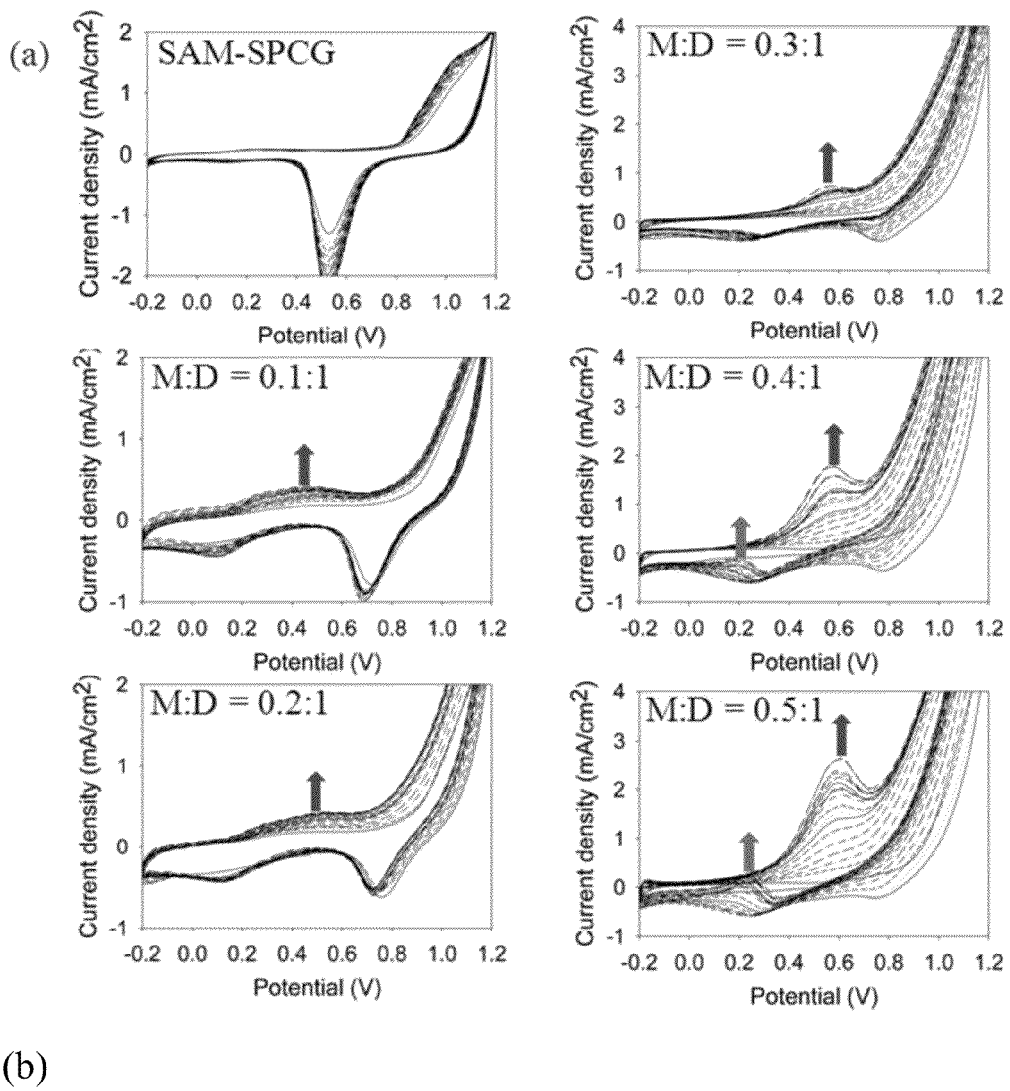
FIG. 14(a) shows cyclic voltammograms of DEN(PtNP)s-loaded SAM-SPCG electrodes at different ratios in an aqueous 0.5 M $H_2SO_4$ solution with MeOH (2 M), wherein the left-upper panel (SAM-SPCG) means SAM-SPCG electrode without loading of DEN(PtNP)s.
FIG. 14(b) is a plot of current density at anodic peak against cycle number. M:D: ● 0.1:1, ○ 0.2:1, ▼ 0.3:1, Δ 0.4:1, ■ 0.5:1.
Figure 14:
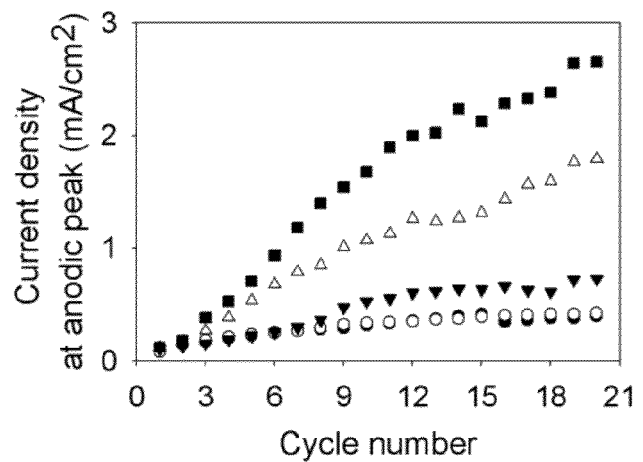

The electrocatalytic activity of DEN(PtNP)s-loaded SAM-SPCG electrodes toward methanol oxidation in an aqueous solution including 0.5 M H$_2$SO$_4$ and 2 M CH$_3$OH was investigated by CV. In the present example, DEN(PtNP)s were prepared at five different molar ratios of Na$_2$PtCl$_6$ to amine terminal group of G4 PAMAM dendrimer (M:D=0.1:1, 0.2:1, 0.3:1, 0.4:1 and 0.5:1) at the constant dendrimer concentration (0.2 wt %) as a stabilizer. In this case, (PtNP)s act as catalysts on electrochemistry as well as reinforcers of electron transfer ability. FIG. 14(*a*) is the CV results for 20 cycles with DEN(PtNP)s-loaded SAM-SPCG electrodes. The CV at each M:D ratio shows an anodic peak of methanol oxidation around 0.5 V in the forward scan.

Stability of DEN(PtNP)s-loaded electrodes on duration of electrochemical reaction were evaluated by repeating up to 20 CV scans over the total scanning time of 90 min. No abnormality was observed on the CV profiles for the methanol oxidation, and the current density of the anodic peak in the forward scan increased with the increasing number of CV scan as seen in FIG. 14(*b*). These observations suggest that DEN(PtNP)s-loaded electrodes possess the high and long-term stability during the electrochemical methanol oxidation.

Figure 15:
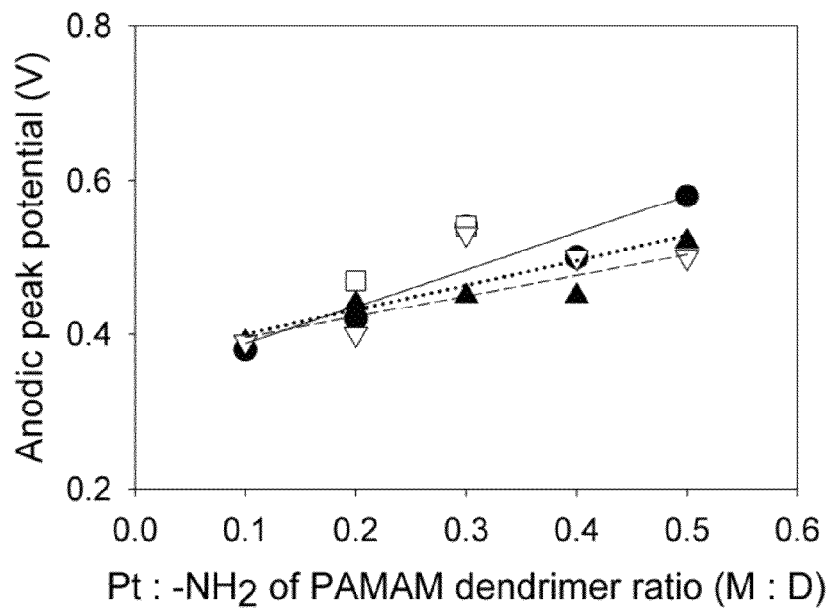
FIG. 15 shows (a) potential and (b) current density of anodic peak against M:D. Electrodes: ● DEN(PtNP)s-loaded SAM-SPCG, ▲ CNT/DEN(PtNP)s-loaded SAM-SPCG, □ DEN(PtNP)s-loaded SPCGC, ∇ CNT/DEN(PtNP)s-loaded SPCGC.
Figure 15:
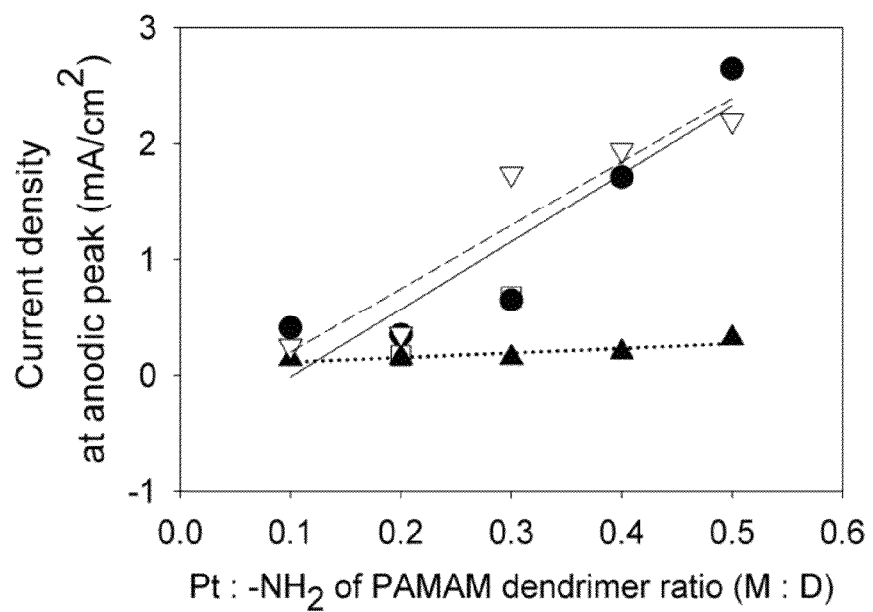

It is well known that in the methanol oxidation reaction, methanol is oxidized to carbon dioxide according to the following reaction by means of catalyst (in the present case, Pt(NP)s): CH$_3$OH+H$_2$O→CO$_2$+6H$^+$+6e$^-$. Then the current density of an anodic peak is directly proportional to the amount of methanol oxidized at the electrode (Dong et al., *Carbon* 2010, 48, 781-787). However, by-products such as formaldehyde, formic acid and other intermediate carbonaceous species are formed and adsorbed on the surface of the electrode, leading to a decrease in the methanol oxidation reaction and hence the reduction of the current density (Arico et al., *Fuel Cells* 2001, 1, 133-159; and Lu et al., *International Journal of Hydrogen Energy* 2008, 33, 3930-3937). Therefore, the efficient electrocatalyst must allow a complete oxidation of methanol and/or intermediate carbonaceous species to carbon dioxide so as to produce higher current density at low potential. The oxidation potential and current density of an anodic peak in a CV curve are often used to determine the activity of the electrocatalyst toward methanol oxidation. The potential and current density of an anodic peak after 20 CV scans on methanol oxidation are plotted as a function of M:D ratio as shown in FIG. 15. It was found that the peak shifted to the higher potential from 0.38 to 0.58 V, and its current density also significantly increased from 0.41 to 2.57 mA/cm$^2$ with M:D ratio. The increase in the current density of the anodic peak is directly attributed to the electrocatalytic activity of the (PtNP)s toward methanol oxidation.

Meanwhile, a small anodic peak attributed to the removal of the incompletely oxidized carbonaceous species such as CO formed during the forward scan was observed around 0.08 and 0.24 V for the DEN(PtNP)s-loaded electrodes at M:D=0.4:1 and 0.5:1, respectively, in the reverse scan. The appearance of this anodic peak in the reverse scan indicates that the catalyst surface becomes poisoned by the deposition of carbonaceous species. The ratio of the current density ($I_F$) of a forward anodic peak to the current density ($I_R$) of the reverse anodic peak, ($I_F/I_R$), can be used to denote the catalyst tolerance to the deposition of carbonaceous species. All the relevant data are listed in Table 1 below. $I_F/I_R$ value of DEN(PtNP)s-loaded electrodes slightly decreased (from 6.33 to 4.94) with M:D (from 0.4:1 to 0.5:1); however, these $I_F/I_R$ values are still higher than that of the commercial Johnson Matthey PtRu/C (JM-PtRu/C) catalyst ($I_F/I_R$=2.8) (Liu et al., *Chem. Mater.* 2008, 20, 1622-1628). High $I_F/I_R$ ratio indicates that DEN(PtNP)s-loaded electrodes have a high catalyst tolerance to the deposition of carbonaceous species on the catalyst surface during the methanol oxidation as compared to the commercial catalyst.

lar current at every M:D ratio. Similar peaks were observed even on CNT-loaded SAM-SPCG electrodes without Pt catalyst (see FIG. 16 (*a*)). These anodic and cathodic peaks can be attributed to the formation of gold oxide and its subsequent removal by reduction, respectively. This observation indicates that the electrochemistry of the gold electrode and the oxidation of methanol occur at the same time and the oxidation and reduction of the gold electrode is dominant over the methanol oxidation. In a case of DEN(PtNP)s-loaded SAM-SPCG electrodes, oxidation/reduction peaks of gold were observed at low M:D values as well as a SAM-SPCG electrode without loading of DEN(PtNP)s but covered over by intensified peaks of methanol oxidation at high M:D values (see FIG. 16(*a*)).

The disappearance of the gold signals during methanol oxidation in the present case (DEN(PtNP)s-loaded SAM-SPCG electrodes) are similar to the electrochemical characteristics of Pt-decorated nanoporous gold (NPG) leaf electrode in an acid solution (Ge et al., *Chem. Mater.* 2007, 19, 5827-5829). It has been reported that the nearly complete coverage of Pt on the NPG electrode surface suppresses almost the gold signals due to the strong interaction between Au substrate and Pt thin layers and can strengthen the bonding between Pt and oxygen-containing species ($SO_4^-$). Hence Pt becomes more active on the electrochemical reaction than Au electrode does. Correspondingly, in the case of DEN(PtNP)s-loaded SAM-SPCG electrodes, the interaction of PtNPs and Au electrode is enough strong, since PtNPs and Au electrode are distanced as short as only the thickness of binder (dendrimer). Thus Pt actively reacts on methanol oxidation with the suppression of gold signals.

Example 6

Electrocatalytic Activity of SPCGC Electrodes Toward Methanol Oxidation

The electrocatalytic activity of CNT/DEN(PtNP)s-loaded electrodes at different M:D ratios toward methanol oxidation was evaluated by CV in an aqueous $H_2SO_4$ (0.5 M) solution

TABLE 1

Anodic peak potential (Epa) and ratio (IF/IR) of anodic peak currents at forward (IF) and reverse (IR) scans.

| Sample M:D | DEN(PtNP)s-loaded SAM-SPCG Electrode | | | CNT/DEN(PtNP)s-loaded SAM-SPCG Electrode | | | DEN(PtNP)s-loaded SPCGC Electrode | | | CNT/DEN(PtNP)s-loaded SPCGC Electrode | | |
|---|---|---|---|---|---|---|---|---|---|---|---|---|
| | Epa (V) | $I_F$ (mA) | $I_F/I_R$ | Epa (V) | $I_F$ (mA) | $I_F/I_R$ | Epa (V) | $I_F$ (mA) | $I_F/I_R$ | Epa (V) | $I_F$ (mA) | $I_F/I_R$ |
| 0.1 | 0.38 | 0.41 | — | 0.39 | 0.14 | — | 0.30 | 0.02 | — | 0.39 | 0.25 | — |
| 0.2 | 0.42 | 0.35 | — | 0.44 | 0.15 | — | 0.47 | 0.17 | 2.28 | 0.40 | 0.35 | — |
| 0.3 | 0.54 | 0.65 | — | 0.45 | 0.15 | — | 0.54 | 0.68 | 3.10 | 0.53 | 1.74 | 4.24 |
| 0.4 | 0.50 | 1.71 | 6.33 | 0.45 | 0.19 | — | | | | 0.50 | 1.94 | 7.76 |
| 0.5 | 0.58 | 2.57 | 4.94 | 0.52 | 0.32 | — | | | | 0.50 | 2.19 | 8.11 |

Figure 16:
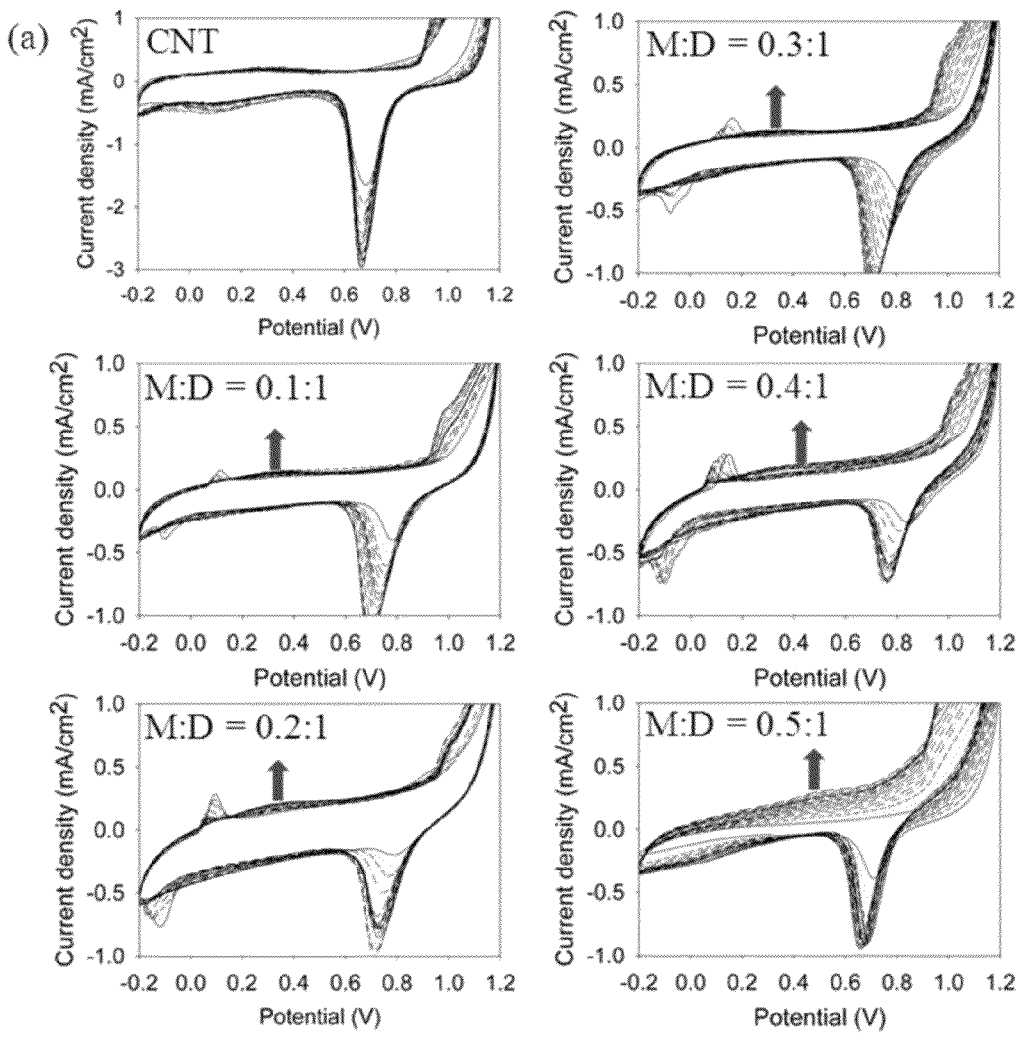
FIG. 16 shows (a) cyclic voltammograms of CNT/DEN (PtNP)s-loaded SAM-SPCG electrodes at different ratios in an aqueous 0.5 M $H_2SO_4$ solution with MeOH (2 M) wherein the left-upper panel (CNT) means carbon nanotube-loaded SAM-SPCG electrode and (b) a plot of current density at anodic peak against cycle number. CNT-loaded: ●. CNT/DEN(PtNP)s-loaded (M:D): ○ 0.1:1, ▼0.2:1, Δ0.3:1, ■0.4:1, □0.5:1.
Figure 16:
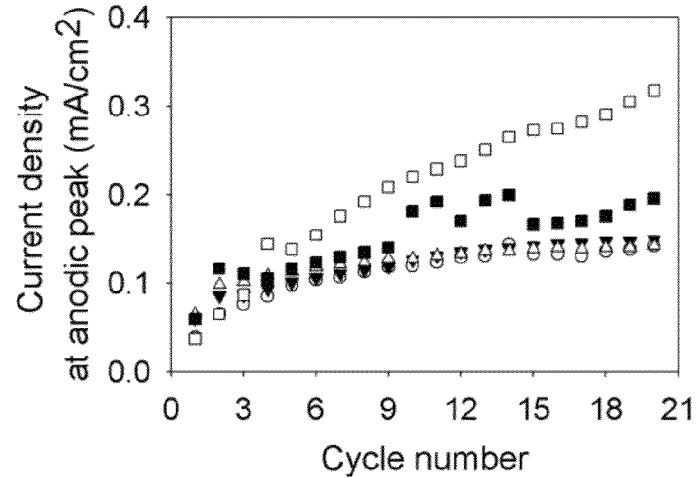
Figure 17:
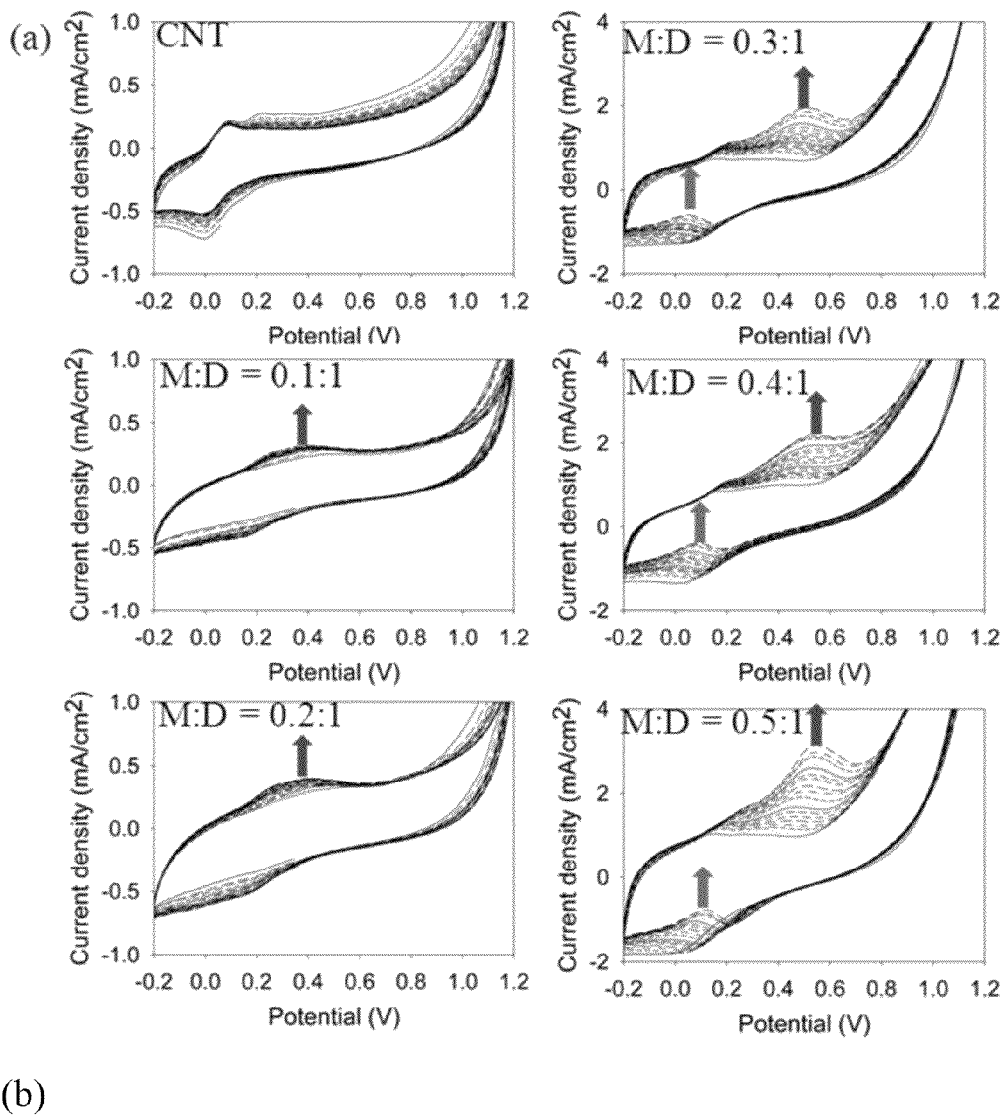
FIG. 17 shows (a) cyclic voltammograms of CNT/DEN (PtNP)s-loaded SPCGC electrodes at different ratios in an aqueous 0.5 M $H_2SO_4$ solution with MeOH (2 M) wherein the left-upper panel (CNT) means carbon nanotube-loaded SPCGC electrode and (b) a plot of current density at anodic peak against cycle number. CNT-loaded: ●. CNT/DEN (PtNP)s-loaded (M:D): ○ 0.1:1, ▼0.2:1, Δ 0.3:1, ■ 0.4:1, □0.5:1.
Figure 17:
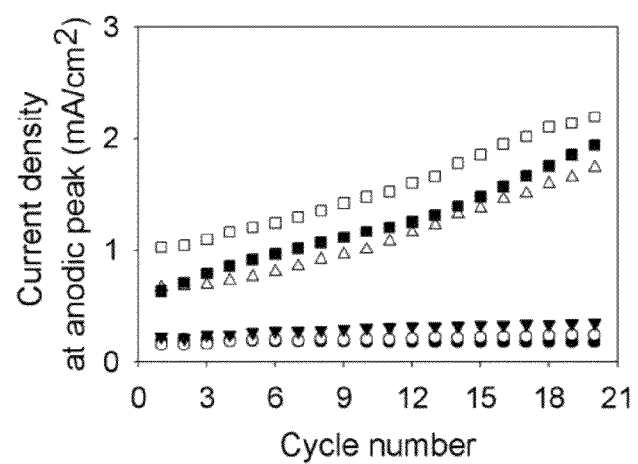

The CVs of CNT/DEN(PtNP)s-loaded SAM-SPCG electrodes for methanol oxidation, as shown in FIG. 16(*a*), revealed only a very small anodic peak around 0.39-0.52 V in forward scan, while the anodic peak in reverse scan was hardly observed. However, the durability of the CNT/DEN(PtNP)s-loaded SAM-SPCG electrodes was still adequate, as the current in the forward scan gradually increased with the CV scan, as seen in FIG. 16(*b*). Moreover, the current slightly increased (from 0.14-0.32 mA/cm$^2$ at 20 scans) with M:D ratio. Meanwhile, an anodic peak around 0.95 V and a cathodic peak around 0.72 V were always detected with simiwith $CH_3OH$ (2 M). The resultant CVs for 20 cycles of CNT/DEN(PtNP)s-loaded SPCGC electrodes are shown in FIG. 17(*a*). For the CVs of the CNT/DEN(PtNP)s-loaded SPCGC electrodes at each M:D ratio, the anodic peak occurred around 0.39-0.53 V in the forward scan. The CNT/DEN(PtNP)-loaded SPCGC electrode at each M:D ratio was also found to possess a high stability toward the electrochemical methanol oxidation as mentioned from the results that the current in the forward scan was nearly constant (M:D=0.1:1 and 0.2:1) or gradually increased (M:D=0.3:1-0.5:1) with the number of CV scan as seen in FIG. 17(*b*).

It has been reported that the electrocatalytic activity of the catalyst is influenced by the composition, the content and the activity efficiency of electrocatalyst, leading to the required current produced during the methanol oxidation (Gu et al., *Langmuir* 2006, 22, 11447-11452). Although the potential of the anodic peak after 20 CV scans slightly increased with M:D ratio, as seen in FIG. 15(a) and Table 1, the methanol oxidation on the CNT/DEN(PtNP)s-loaded SPCGC electrodes still occurred at lower potential than the previous reports (Gu et al., *Langmuir* 2006, 22, 11447-11452; and Guo et al., *Journal of Solid State Electrochemistry* 2008, 12, 1393-1397). Pt-MWCNT and Pt—Si-MWCNT catalysts oxidized methanol at the potential of 0.74 (Gu et al., *Langmuir* 2006, 22, 11447-11452) and 0.76 (Guo et al., *Journal of Solid State Electrochemistry* 2008, 12, 1393-1397) V, respectively. A lower potential of anodic peak indicates that the methanol oxidation occurs more easily on the electrode. In addition, the CVs revealed that the current density of anodic peak from CNT/DEN(PtNP)s-loaded SPCGC electrodes significantly increased (from 0.25 to 2.19 mA/cm$^2$) with M:D ratio (see FIG. 15(b) and Table 1). These results suggest that CNT/DEN(PtNP)s play an important role on the promotion of the methanol oxidation at the electrode.

The anodic peak in the reverse scan of CNT/DEN(PtNP)s-loaded SPCGC electrodes were observed around 0.05-0.11 V after 20 CV scans for CNT/DEN(PtNP)s of M:D=0.3:1-0.5:1. The calculated $I_F/I_R$ value increased (from 4.24 to 8.11) as M:D ratio increased (from 0.3-0.5:1) (See Table 1). These results indicate that the CNT/DEN(PtNP)s have high catalyst tolerance to the deposition of carbonaceous species in comparison with the previous reports (Gu et al., *Langmuir* 2006, 22, 11447-11452; and Guo et al., *Journal of Solid State Electrochemistry* 2008, 12, 1393-1397). Pt-MWCNT catalysts, which were prepared by vacuum pyrolysis of Pt precursor on the MWCNT, had the $I_F/I_R$ value of 0.75 (Gu et al., *Langmuir* 2006, 22, 11447-11452), while the $I_F/I_R$ value of Pt—Si-MWCNT catalysts prepared by deposition of PtNPs on silane-modified MWCNT was 1.8 (Guo et al., *Journal of Solid State Electrochemistry* 2008, 12, 1393-1397).

The high current density of anodic peak and the high $I_F/I_R$ value observed on CNT/DEN(PtNP)s-loaded SPCGC electrodes indicate that methanol is almost completely oxidized to carbon dioxide but a few carbonaceous species is adsorbed after the forward scan on the CNT/DEN(PtNP)s-loaded SPCGC electrodes. These observations suggest that the CNT/DEN(PtNP)s-loaded SPCGC electrodes possess high stability, and electrocatalytic activity toward the methanol oxidation.

Figure 18:
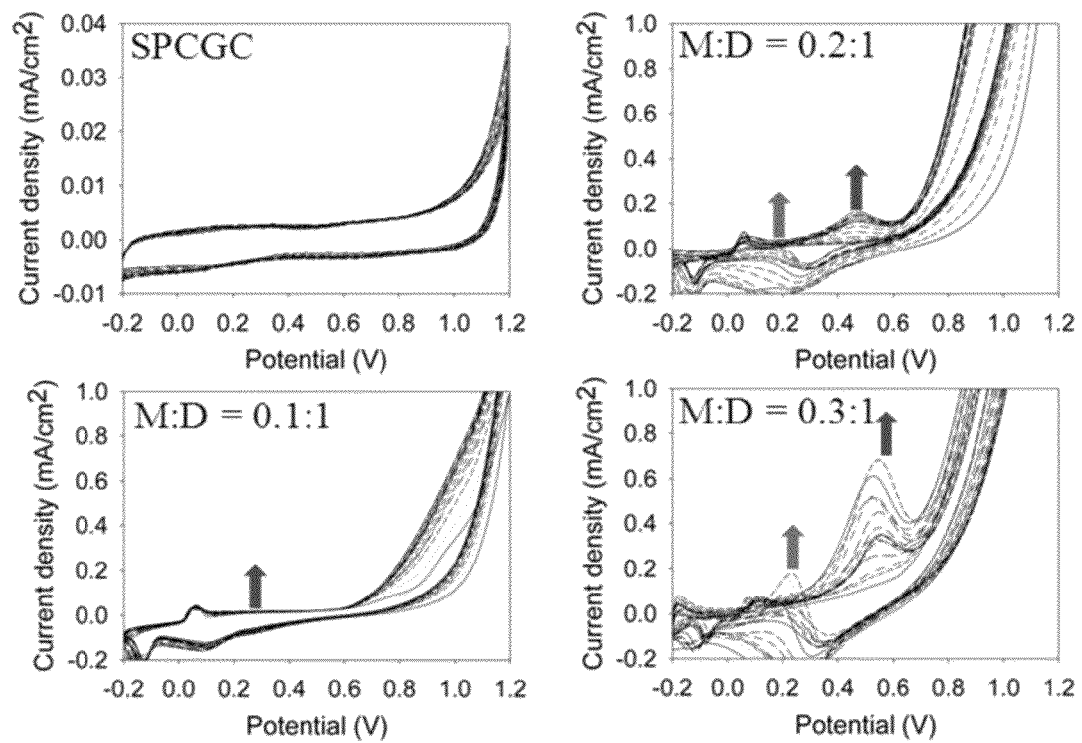
FIG. 18 shows cyclic voltammograms of DEN(PtNP)s-loaded SPCGC electrodes at different ratios in an aqueous 0.5 M $H_2SO_4$ solution with MeOH (2 M) wherein the left-upper panel (SPCGC) means bare SPCGC electrode.

The CVs of DEN(PtNP)s-loaded SPCGC electrodes at M:D=0.1:1-0.3:1 for methanol oxidation, as seen in FIG. 18, revealed an anodic peaks around 0.30-0.54 V in forward scan and around 0.16-0.23 V in reverse scan. The current slightly increased (from 0.02-0.68 mA/cm$^2$ at 20 scans) with M:D ratio. The calculated $I_F/I_R$ value increased from 2.28 to 3.10 at M:D=0.2:1 to 0.3:1 (See Table 1). It was observed that the current density obtained from DEN(PtNP)s-loaded SPCGC electrode was lower than CNT/DEN(PtNP)s-loaded SPCGC electrode at the same M:D. Thus, it can be referred that CNTs effectively enhance the catalytic activity of PtNPs for the methanol oxidation.

Table 2 below summarizes the electrocatalytic activity for the methanol oxidation of PtNPs on the catalyst support by using electrodes from different preparation methods (Yu et al., *J. Phys. Chem. C.* 2010, 114, 3575-3579; Girishkumar et al., *J. Phys. Chem. B.* 2004, 108, 19960-19966; Ledesma-Garcia et al., *J. Appl. Electrochem,* 2008, 38, 515-522; Selvarani et al., *J. Phys. Chem. C,* 2009, 113, 7461-7468; and Lee et al., *Fuel Cells.* 2010, 10(2), 221-226). It can be noticed that CNT/DEN(PtNP)s-loaded electrodes revealed lower potentials of an anodic oxidation peak and the higher catalyst tolerance to the deposition of carbonaceous species on the catalyst surface than the other PtNPs systems on carbon supports. It is suggested from the comparison that the present electrodes are good candidates as an electrocatalyst for direct methanol fuel cell applications.

TABLE 2

Anodic peaks at forward and reverse scans of the different PtNPs on the catalyst support prepared by different methods and electrodes toward the methanol oxidation.

| Electrode | Preparation | Oxidation peak (V) | | Ref. |
|---|---|---|---|---|
| | | Forward | Reverse | |
| Optically transparent electrodes (OTE)-coated by SWCNT film | Electrodeposition of Pt NPs | 0.80 | 0.65 | Girishkumar et al. |
| Glassy carbon disk | Drop-casting of carbon-supported Pt and Pt—Au NPs in Nafion ® | 0.67-0.72 | 0.50-0.58 | Selvarani et al. |
| Glassy carbon rotating disk | Deposition of DEN(Pt)s in Nafion | 0.85 | 0.65 | Ledesma-Garcia et al. |
| Glassy carbon disk | Drop-casting of Pt/MWCNT | 0.70 | 0.50 | Lee et al. |
| MWCNT-modified glassy carbon | Electrodeposition and dip-coating of Pt NPs | 0.66 | 0.47 | Yu et al. |
| SPCGC in DEP chip | Physical immobilization of CNT/DEN(PtNP)s or DEN(PtNP)s through dendrimer binder | 0.30-0.54 | 0.16-0.23 | present |
| SPCG in DEP chip | Chemical immobilization of CNT/DEN(PtNP)s or DEN(PtNP)s through dendrimer binder | 0.38-0.58 | 0.08-0.24 | present |

Example 7

Electrochemical Detection of Organophosphate Pesticide (Diazinon Oxon, DZN)

Figure 19:
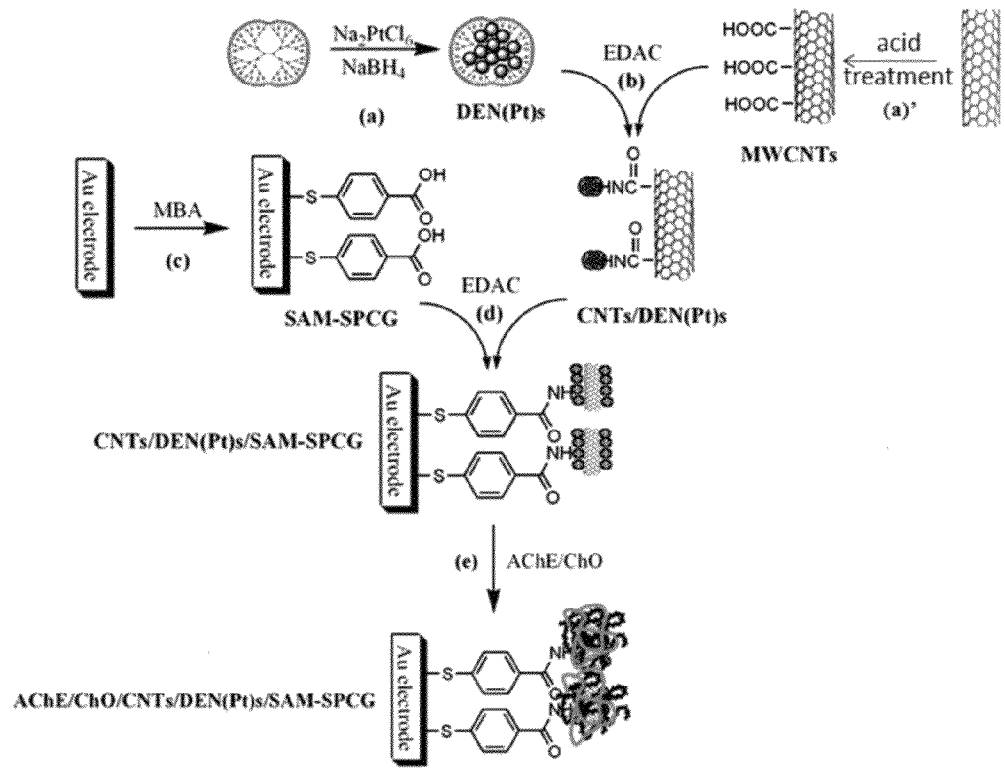
FIG. 19 shows (a) the preparation of AChE/ChO/CNTs/DEN(PtNPs)-loaded DEP chips, and (b) the electrochemical enzyme reaction on the DEP chip, wherein AChE means acetylcholine esterase and ChO means choline oxidase.
Figure 19:
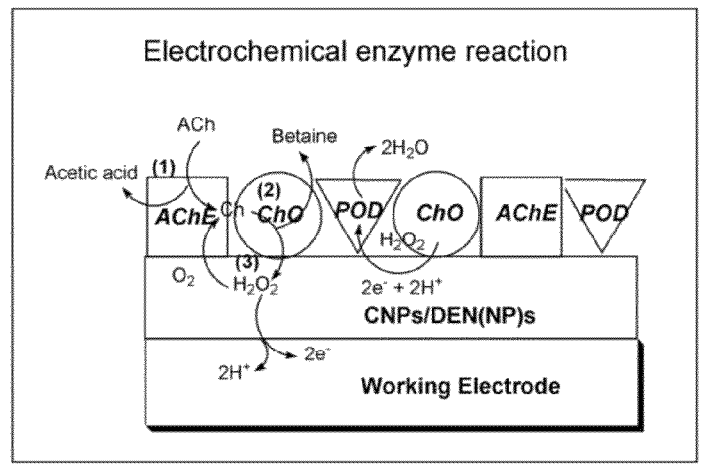

AChE, ChO and POD enzymes were adsorbed on CNT/DEN(PtNP)s-loaded SPCGC electrode. The aqueous solution containing AChE/ChO/POD was dropped on the CNT/DEN(PtNP)s-loaded SPCGC surface and the adsorption was allowed to occur for 24 hours. The AChE-ChO-POD-adsorbed CNT/DEN(PtNP)s-loaded (AChE/ChO/POD/CNT/DEN(PtNP)s-loaded) SPCGC DEP chip was stored at 4° C.

till use. FIG. 19 shows (a) the preparation of AChE/ChO/CNTs/DEN(PtNPs) loaded DEP chips and (b) the electrochemical enzyme reaction of the DEP chips.

Electrochemical detection of a DZN compound on the AChE/ChO/POD/CNT/DEN(PtNPs)-loaded SPCGC electrode was performed on a CV (a Hokuto-Denko HZ-3000) apparatus in the potential range of −0.6 to 1 V at a scan rate of 20 mVs$^{-1}$ in a phosphate buffer solution. All the measurements were carried out at room temperature in 2 cm$^3$ of a test solution, which has to cover the circular working electrode area of the sensors supported vertically during the CV measurement. The anodic oxidation peak at 0.06-0.1 V was used to evaluate the inhibition of AChE activity by DZN. The enzyme inhibition was calculated according to the following equation (Equation 1) (Dounin et al., *Analytica Chimica Acta* 2010, 669, 63-67):

$$\% \text{ inhibition} = 100(I_o - I_x)/I_o \quad [\text{Equation 1}],$$

wherein $I_o$ is the anodic peak current of oxidation at 0.06-0.1 V of a control sample in the absence of DZN, while $I_x$ refers to the peak current of DZN-containing samples.

For the electrochemical detection of DZN compound, CNT/DEN(PtNPs) hybrids at M:D 0.4:1 was fabricated onto the SPCGC electrode. Then, an AChE/ChO/POD/CNT/DEN(PtNPs)-loaded SPCGC biosensor was developed by loading 10 mm$^3$ of 2.21 U of AChE, 4.3 U of ChO and 44.7 U of POD on the CNT/DEN(PtNPs)-loaded SPCGC electrode. The bioactivity of the AChE/ChO/POD/CNT/DEN(PtNPs)-loaded SPCGC biosensor was investigated by CV at room temperature.

The approach for determination of one (DZN) of organophosphate pesticides by this biosensor is based on the inhibition of AChE activity. In the absence of DZN, AChE hydrolyzes Ach to acetic acid and choline (Ch) (Lin et al., *Electroanalysis*, 2004, 16(1-2), 145-149):

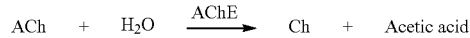

ChO oxidizes Ch to betaine and $H_2O_2$:

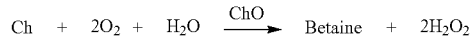

$H_2O_2$ can be easily oxidized by PtNPs or reduced by POD:

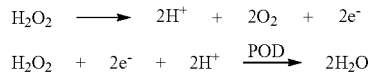

The inhibition of AChE activity by DZN was determined by measuring the oxidation or reduction current of $H_2O_2$ which is correlated to the concentration of Ch produced by AChE.

Figure 20:
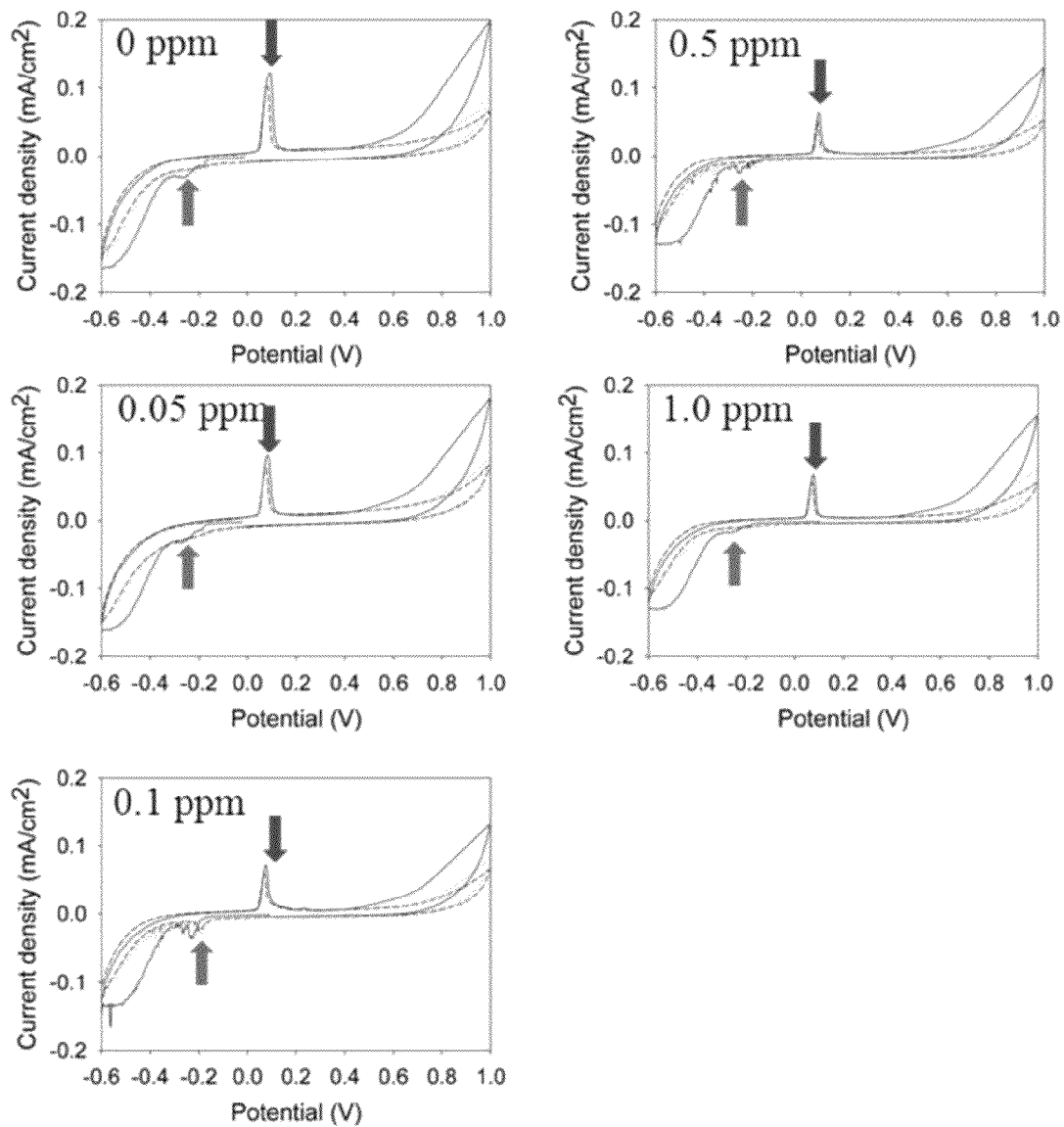
FIG. 20 shows cyclic voltammograms of AChE/ChO/POD/CNT/DEN(Pt)s-loaded SPCGC electrodes in a 10 mM phosphate buffer solution (pH 7.4) of acetylcholine (Ach). Number in charts denotes the concentration of diazinon oxon (DZN).

The CVs of an AChE/ChO/POD/CNT/DEN(PtNPs)-loaded SPCGC electrode in a 10 mM phosphate buffer (pH 7.4) solution of ACh showed a well-defined anodic oxidation peak at the potential around 0.09 V with the anodic peak current density of 0.12 mA/cm$^2$ as seen in FIG. 20. This anodic oxidation peak is attributed to the oxidation of hydrogen peroxide ($H_2O_2$) generated from the enzymatic reaction of AChE and ChO. The peak potential of $H_2O_2$ oxidation by the present electrode was lower than by an AChE/ChO/CNT electrode (0.50 V) (Lin et al., *Electroanalysis*, 2004, 16(1-2), 145-149). It might be attributed to the presence of DEN(PtNP)s on this biosensor that the AChE/ChO/POD/CNT/DEN(PtNPs)-loaded SPCGC electrode possessed an excellent electrocatalytic activity toward the oxidation of $H_2O_2$ at low potential. The demonstration of the low oxidation potentials reveals an advantage of this electrode, because there is no interference from the other electroactive species in the sample due to the high applied potential. Meanwhile, a very small reduction peak around −0.2 V was also observed at only the first CV scan. This peak is attributed to the reduction of the generated $H_2O_2$ by POD. From this observation, it can be suggested that the generated $H_2O_2$ was almost oxidized by DEN(PtNPs) and only the small amount of $H_2O_2$ was reduced by POD on this biosensor. Therefore, the inhibition of AChE by DZN can be determined by the decrease in the oxidation current at 0.09 V.

In the presence of DZN in the ACh solution, the CV of this electrode also revealed one anodic oxidation peak, which shifted to lower potential and decreased in the current density with DZN concentration. It can be suggested that the decrease in the obtained anodic current at 0.09 V is due to the inhibition of the AChE activity by a DZN compound: In the presence of DZN, the AChE is inhibited and its enzymatic activity decreases, leading to the diminution in Ch concentration and in the amount of $H_2O_2$ generated from the enzymatic reaction.

The obtained currents of anodic oxidation peak were utilized to evaluate the enzyme activity, $I_o/I_x$, and the inhibition value, $(I_o-I_x)/I_o$, where $I_o$ and $I_x$ are current densities in ACh solutions without and with DZN. The calculated values are listed in Table 3 below.

TABLE 3

Enzyme activity and % inhibition of acetylcholinesterase.

| DZN (ppm) | $I_x/I_o$ | % Enzyme Activity | $[I_o-I_x]/I_o$ | % Inhibition |
|---|---|---|---|---|
| 0.05 | 0.785 | 78.6 | 0.214 | 21.4 |
| 0.1 | 0.590 | 59.1 | 0.409 | 40.9 |
| 0.5 | 0.524 | 52.5 | 0.475 | 47.6 |
| 1 | 0.171 | 17.2 | 0.828 | 82.8 |
| 5 | 0.231 | 23.2 | 0.768 | 76.8 |
| 10 | 0.133 | 13.4 | 0.866 | 86.6 |

Figure 21:
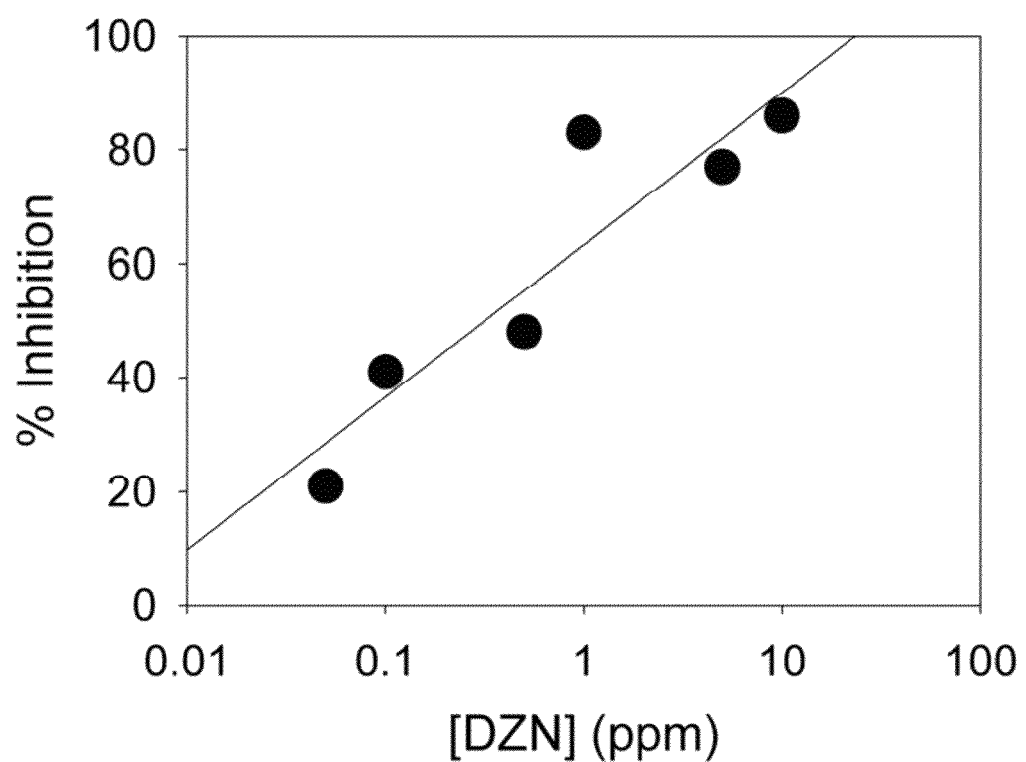
FIG. 21 is a plot of inhibition % of AChE enzyme reaction by DZN.

It was found that the enzyme activity decreased and the inhibition % increased with increasing DZN concentration, as seen in FIG. 21. A linear relationship between the inhibition % and logarithmic DZN concentration covered the DZN concentration range from 0.05 to 10 ppm. That is, the detection limit for DZN by this biosensor is 0.05 ppm, which is considerably low in comparison with the reports earlier (0.1 ppm) (Nagatani et al., Food Control. 2007, 18, 914-920). It should be noted that the AChE/ChO/POD/CNT/DEN(PtNP)s-loaded SPCGC electrode revealed an excellent detection performance for DZN based on the inhibition of enzyme reaction.

CONCLUSIONS

Hybrids of CNT/DEN(PtNP)s and DEN(PtNP)s with different M:D values, namely, different Pt(NP)s contents were successfully loaded on SAM-SPCG and SPCGC electrodes through chemical and adhesion bindings, respectively. All electrodes possessed high durability, reactivity and stability, since CNT/DEN(PtNP)s and DEN(PtNP)s still retained their chemical and physical immobilization on the DEP chips through G4 PAMAM dendrimers as binders even after 20 cycles of CV scan. Meanwhile, these electrodes revealed high electrochemical activity, since each component in the hybrids promoted the electron transfer between the electrodes and the redox species in the solution phase.

The electrocatalytic activities of four types of electrodes were examined toward methanol oxidation. It was observed that the electrodes revealed, in common, lower potential of anodic peak around 0.38-0.58 V in the forward scan than the previous reports (0.66-0.85 V), where (PtNP)s were loaded on the catalyst support by using different preparation methods and electrodes, as seen in Table 3. This means the methanol oxidation reaction occurs more easily on the present electrodes. It should be also noted that the potentials of an anodic peak in the forward scan increase with increasing the content of Pt(NP)s without significant difference among four electrodes, indicating the promotion of electrocatalytic activity in relation of amount of catalyst.

The current density of the anodic peak in the forward scan increased with increasing the content of (PtNP)s for three electrodes except CNT/DEN(PtNP)s-loaded SAM-SPCG electrode. This result suggests that (PtNP)s play an important role as catalyst on the promotion of the methanol oxidation at the electrode, since the current density at anodic peak is directly proportional to the amount of methanol oxidized at the electrode. A weak anodic peak in the reverse scan appeared around 0.08-0.24 V against 0.47-0.65 V from literatures (Table 2). Then the ratio of current densities of anodic peaks in forward and reverse scans, $I_F/I_R$, is the barometer of a catalyst tolerance to the deposition of carbonaceous species on the catalyst surface during the methanol oxidation. The calculated values (2.3-8.1) for three electrodes except CNT/DEN(PtNP)s-loaded SAM-SPCG Electrode, as seen in Table 1, are higher than the values from literature (0.7-3.0), suggesting that methanol is almost completely oxidized to carbon dioxide and a few carbonaceous species is adsorbed after the forward scan on these three electrodes.

In the case of the electrocatalytic activity of CNT/DEN (PtNP)s-loaded SAM-SPCG electrodes toward methanol oxidation, although the electrochemistry of the gold electrode and the oxidation of methanol occurs at the same time, the oxidation and the reduction of gold electrode is dominant over the methanol oxidation at the electrode. The clarification of the reason is still under consideration.

The AChE/ChO/POD/CNT/DEN(PtNP)s-loaded SPCGC electrodes, which was fabricated by the physical immobilization of three enzymes (AChE, ChO, and POD) on CNT/DEN(PtNP)s-loaded SPCGC electrodes, showed an excellent electrocatalytic activity on the enzyme reaction toward the oxidation of $H_2O_2$ at low potential around 0.09 V and the excellent detection performance for bio-contaminants (DZN) based on the inhibition of enzyme reaction with a predominant detection limit of 0.05 ppm. This indicates the remarkable sensitivity and the selective detection ability of the present electrodes for any kinds of target molecules, if the adequate molecular recognition or reaction system is loaded on the electrodes. Moreover, the DEP chips are adequate for a small amount of analytes and rapid testing. Therefore, the present approach provides the advanced development of effective and versatile electrochemical sensing systems for wide applications as biomedical, chemical, and environmental sensors.

We claim:

1. A method for fabricating a carbon nanotube-loaded electrode, comprising
   (a) providing metal nanoparticles-encapsulated dendrimer having a first functional group and carbon nanotubes having a second functional group, wherein the metal nanoparticles-encapsulated dendrimer is prepared by reducing a metal precursor in a condition allowing synthesis of metal nanoparticles in the presence of a dendrimer molecule having amine terminal groups, in which the metal precursor and the amine terminal groups of the dendrimer molecule are present at a molar ratio of being 0.5:1 or less,
   (b) reacting the metal nanoparticles-encapsulated dendrimer with the carbon nanotubes to form a first covalent bond between the first functional group of the metal nanoparticles-encapsulated dendrimer and the second functional group of the carbon nanotubes in the presence of a first condensing agent so as to produce hybrid carbon nanotubes having a third functional group;
   (c) providing a metal electrode coated with a self-assembled monolayer (SAM) having a fourth functional group; and
   (d) reacting the hybrid carbon nanotubes with the metal electrode to form a second covalent bond between the third functional group of the hybrid carbon nanotubes and the fourth functional group of the metal electrode in the presence of a second condensing agent so as to produce the carbon nanotube-loaded electrode.

2. The method of claim 1, wherein the first covalent bond or the second covalent bond is an amide bond.

3. The method of claim 1, wherein the first functional group is an amine group or the second functional group is a carboxylic acid group.

4. The method of claim 1, wherein the metal precursor are selected from the group consisting of silver (Ag), gold (Au), platinum (Pt), palladium (Pd), copper (Cu), cobalt (Co), chromium (Cr), nickel (Ni), CuO, $ZnO_2$, $TiO_2$, $Al_2O_3$, $SiO_2$, PbS and MgO.

5. The method of claim 1, wherein the first condensing agent or the second condensing agent is 1-[3-(dimethylamino)propyl]-3-ethylcarbodiimide hydrochloride (EDAC) or N,N'-dicyclohexylcarbodiimide.

6. The method of claim 1, wherein the metal electrode is selected from the group consisting of platinum (Pt), palladium (Pd), indium (In), gold (Au) and an alloy thereof.

7. The method of claim 1, wherein the SAM is selected from the group consisting of 4-mercaptobenzoic acid, 11-mercaptoundecanoic acid, and 3-mercaptopropionic acid.

8. A method for fabricating a carbon nanotube-loaded electrode, comprising
   (a) providing Pt nanoparticles-encapsulated dendrimer (DEN(PtNP)s) having a first amine group and acidified carbon nanotubes having a carboxylic acid group,
   (b) reacting DEN(PtNP)s with the acidified carbon nanotubes to form a first amide bond between the first amine group of DEN(PtNP)s and the carboxylic acid group of the acidified carbon nanotubes in the presence of a first condensing agent so as to produce hybrid carbon nanotubes (CNT/DEN(PtNP)s) having a second amine group;
   (c) providing a gold electrode coated with a self-assembled monolayer (SAM) having a carboxylic acid group; and
   (d) reacting the CNT/DEN(PtNP)s with the gold electrode to form a second amide bond between the second amine group of the CNT/DEN(PtNP)s and the carboxylic acid group of the gold electrode in the presence of a second condensing agent so as to produce the carbon nanotube-loaded electrode.

9. The method of claim 8, wherein the Pt nanoparticles-encapsulated dendrimer (DEN(PtNP)s) is prepared by reducing Pt precursor in a condition allowing synthesis of Pt nanoparticles in the presence of a polyamidoamine (PAMAM) dendrimer molecule having amine terminal groups.

10. The method of claim 9, wherein the Pt precursor and the amine terminal groups of the dendrimer molecule are present at a molar ratio of being 0.5:1 or less.

11. The method of claim 8, wherein the first condensing agent and the second condensing agent are 1-[3-(dimethylamino)propyl]-3-ethylcarbodiimide hydrochloride (EDAC).

12. The method of claim 8, wherein the SAM is 4-mercaptobenzoic acid.

13. A method for fabricating a carbon nanotube-loaded electrode, comprising
   (a) providing metal nanoparticles-encapsulated dendrimer having a first functional group and carbon nanotubes having a second functional group,
   (b) reacting the metal nanoparticles-encapsulated dendrimer with the carbon nanotubes to form a first covalent bond between the first functional group of the metal nanoparticles-encapsulated dendrimer and the second functional group of the carbon nanotubes in the presence of a first condensing agent so as to produce hybrid carbon nanotubes having a third functional group;
   (c) providing a metal electrode coated with a self-assembled monolayer (SAM) having a fourth functional group; and
   (d) reacting the hybrid carbon nanotubes with the metal electrode to form a second covalent bond between the third functional group of the hybrid carbon nanotubes and the fourth functional group of the metal electrode in the presence of a second condensing agent so as to produce the carbon nanotube-loaded electrode,
   wherein the SAM is selected from the group consisting of 4-mercaptobenzoic acid, 11-mercaptoundecanoic acid, and 3-mercaptopropionic acid.

* * * * *